United States Patent
Jelčicová et al.

(10) Patent No.: US 11,696,079 B2
(45) Date of Patent: Jul. 4, 2023

(54) HEARING DEVICE COMPRISING A RECURRENT NEURAL NETWORK AND A METHOD OF PROCESSING AN AUDIO SIGNAL

(71) Applicant: Oticon A/S, Smørum (DK)

(72) Inventors: Zuzana Jelčicová, Smørum (DK); Rasmus Jones, København NV (DK); David Thorn Blix, Smørum (DK); Michael Syskind Pedersen, Smørum (DK); Jesper Jensen, Smørum (DK); Asger Heidemann Andersen, Frederikssund (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 17/580,493

(22) Filed: Jan. 20, 2022

(65) Prior Publication Data
US 2022/0232331 A1    Jul. 21, 2022

Related U.S. Application Data

(63) Continuation-in-part of application No. 17/153,168, filed on Jan. 20, 2021, now Pat. No. 11,330,378.

(51) Int. Cl.
*H04R 25/00* (2006.01)

(52) U.S. Cl.
CPC ......... *H04R 25/453* (2013.01); *H04R 25/405* (2013.01)

(58) Field of Classification Search
CPC .. H04R 25/507; H04R 25/405; H04R 25/407; H04R 25/606; H04R 2225/025; H04R 2225/43; H04R 2225/67

(Continued)

(56) References Cited

U.S. PATENT DOCUMENTS 9,972,339 B1 *   5/2018   Sundaram ............... G10L 25/30

FOREIGN PATENT DOCUMENTS

EP    3 694 229 A1    8/2020

OTHER PUBLICATIONS

Chang Gao, DeltaRNN: A Power-efficient Recurrent Neural Network Accelerator (Year: 2018).*

(Continued)

*Primary Examiner* — Norman Yu
(74) *Attorney, Agent, or Firm* — Birch, Stewart, Kolasch & Birch, LLP

(57) ABSTRACT

A hearing device, e.g. a hearing aid or a headset, configured to be worn by a comprises an input unit for providing at least one electric input signal in a time-frequency representation; and a signal processor comprising a target signal estimator for providing an estimate of the target signal; a noise estimator for providing an estimate of the noise; and a gain estimator for providing respective gain values in dependence of said target signal estimate and said noise estimate. The gain estimator comprises a trained neural network, wherein the outputs of the neural network comprise real or complex valued gains, or separate real valued gains and real valued phases. The signal processor is configured—at a given time instance t—to calculate changes $\Delta x(i,t) = x(i,t) - \hat{x}(i,t-1)$, and $\Delta h(j,t-1) = h(j,t-1) - \hat{h}(j,t-2)$ to an input vector $x(t)$ and to the hidden state vector $h(t-1)$, respectively, from one time instance, $t-1$, to the next, $t$, and where $\hat{x}(i,t-1)$ and $\hat{h}(j,t-2)$ are estimated values of $x(i,t-1)$ and $h(j,t-2)$, respectively, where indices $i$, $j$ refers to the $i^{th}$ input neuron and the $j^{th}$ neuron of the hidden state, respectively, where $1 \leq i \leq N_{ch,x}$ and $1 \leq j \leq N_{ch,oh}$, wherein $N_{ch,x}$ and $N_{ch,oh}$ is the number of processing channels of the input vector $x$ and the hidden state vector $h$, respectively, and wherein the signal processor is further configured to provide that the number of updated (Continued)

channels among said $N_{ch,x}$ and said $N_{ch,oh}$ processing channels of the modified gated recurrent unit for said input vector x(t) and said hidden state vector h(t−1), respectively, at said given time instance t is limited to a number of peak values $N_{p,x}$, and $N_{p,oh}$, respectively, where $N_{p,x}$ is smaller than $N_{ch,x}$, and $N_{p,oh}$, is smaller than $N_{ch,oh}$.

20 Claims, 17 Drawing Sheets

(58) Field of Classification Search
 USPC .......................................................... 381/317
 See application file for complete search history.

(56) References Cited

OTHER PUBLICATIONS

Neil et al., "DeltaRNN: A Power-efficient Recurrent Neural Network Accelerator," published in FPGA '18: Proceedings of the 2018 ACM/SIGDA International Symposium on Field-Programmable Gate Arrays, Monterey, CA, USA, Feb. 2018, pp. 21-30.

* cited by examiner

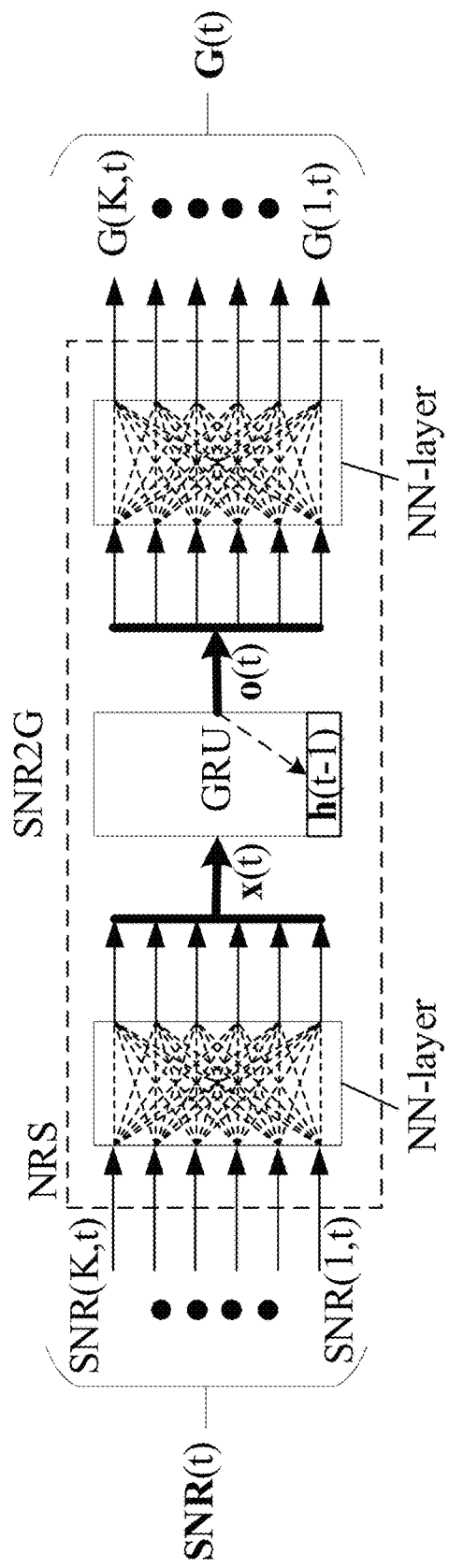 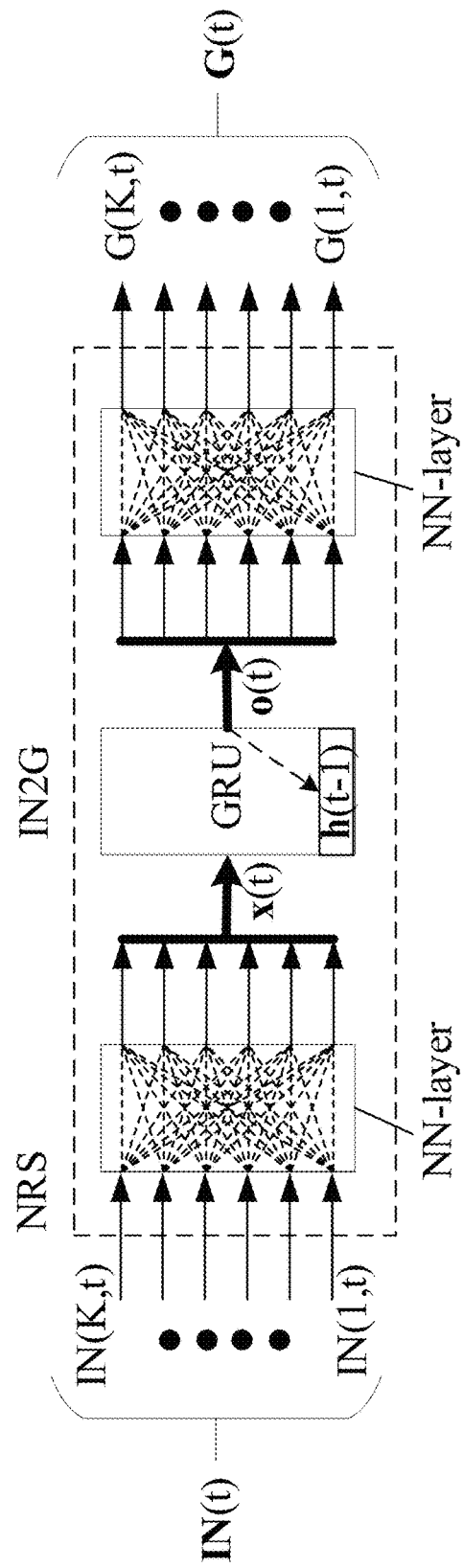
FIG. 2A
FIG. 2B

HEARING DEVICE COMPRISING A RECURRENT NEURAL NETWORK AND A METHOD OF PROCESSING AN AUDIO SIGNAL

This application is a Continuation-in-Part of co-pending application Ser. No. 17/153,168, filed on Jan. 20, 2021. The above application is hereby expressly incorporated by reference, in its entirety, into the present application.

SUMMARY

The present disclosure deals with improvements in audio or video processing, using a neural network, in particular a recurrent neural network, such as a delta recurrent neural network (delta RNN), e.g. long short-term memory (LSTM) type of RNN, or a gated recurrent unit (GRU), or a modification thereof. The improvement is exemplified in the field of audio processing, specifically applied in a hearing device, such as a hearing aid or a headset.

The improvement may be applied to any problem related to processing of data, e.g. data representing time variant processes, e.g. audio or video processing. It may be particularly advantageous in applications where processing power is limited, and e.g. where (significant) changes in data from one time step to the next are limited, e.g. to less than 20% of the data. Such examples occur in video images from one frame to the next or in audio data, e.g. represented by a spectrogram from one time-frame to the next (or within a time frame, from one frequency channel to the neighbouring frequency channel, see e.g. FIG. 7).

An exemplary hearing device, e.g. a hearing aid or a headset, may comprise an input unit for providing at least one electric input signal in a time-frequency representation k, t, where k and t are frequency and time indices, respectively, and k represents a frequency sub-band channel, k=1, . . . , K, K>1, the at least one electric input signal being representative of sound, which may comprise target signal components and noise components. The input unit may e.g. comprise an input transducer, e.g. a microphone. The hearing device, e.g. the input unit, may comprise an analogue to digital converter and/or a filter bank. The hearing device, e.g. the input win may comprise one or more beamformers for providing a spatially filtered signal based on the at least one electric input signal (e.g. comprising at least two electric input signals) or a signal originating therefrom. The hearing device may further comprise a signal processor connected to the input unit and configured to receive the at least one electric input signal or a signal originating therefrom (e.g. a spatially filtered and/or feedback corrected signal). The signal processor may comprise a noise reduction system configured to reduce noise components in the at least one electric input signal or a signal originating therefrom. The signal processor may be configured to determine respective gain values $G(k,t)$ in said time-frequency representation, which when applied to said at least one electric input signal or a signal originating therefrom reduce said noise components relative to said target signal components.

A Signal Processor Configured to Execute a Modified Gated Recurrent Unit ('Modified GRU') and a Corresponding Method The signal processor may comprise a neural network comprising at least one layer defined as delta recurrent neural network (delta RNN) comprising memory. The delta RNN may e.g. comprise a long short-term memory (LSTM) type of RNN or a gated recurrent unit (GRU) or a modification thereof. The at least one layer may be implemented as GRU (or modified GRU) comprising memory, e.g. in the form of a hidden state (cf. e.g. vector $h(k,t-1)$ in FIG. 1A). The signal processor is configured to execute the recurrent_neural network comprising the at least one layer implemented as a GRU (e.g. a modified GRU according to the present disclosure). The GRU (or a modified GRU according to the present disclosure) provides an output vector $o(k,t)$ in dependence of an input vector $x(k,t)$ and the hidden state vector $h(k,t-1)$, and wherein the output $o(k,t)$ at a given time step t is stored as the hidden state $h(k,t)$ and used in the calculation of the output vector $o(k,t+1)$ in the next time step t+1. The noise reduction system may comprise (such as be implemented by) the neural network. Parameters of the neural network may have been trained with a plurality of training signals. The signal processor may be configured—at a given time instance t—to calculate changes $\Delta x(k,t)=x(k,t)-\hat{x}(k,t-1)$ and $\Delta h(k,t-1)=h(k,t-1)-\hat{h}(k,t-2)$ to the input vector $x(k,t)$ and to the hidden state vector $h(k,t-1)$, respectively, from one time instance, t−1, to the next, t, and where $\hat{x}(k,t-1)$ and $\hat{h}(k,t-2)$ are estimated values of x and h, respectively. The estimated values $\hat{x}(k,t-1)$ and $\hat{h}(k,t-2)$ may be equal to values of x and h (at least) one time step earlier. The estimated values $\hat{x}(k,t-1)$ and $\hat{h}(k,t-2)$ may be stored in memory and used in the calculations at time step t. The estimated values $\hat{x}(k,t-1)$ and $\hat{h}(k,t-2)$ may be equal to the last value of x and h respectively, causing an above-threshold change (from one time step to the next). The signal processor may further be configured to provide that the number of updated channels for the input vector $x(k,t)$ and said hidden state vector $h(k,t-1)$, respectively, at said given time instance t is limited to a number of peak (i.e. largest) values $N_p$; (or $N_{p,x}$, $N_{p,oh}$, see below), where $N_p$ is smaller than (or equal to) $N_{ch}$ (or $N_{ch,x}$, $N_{ch,oh}$), where $N_{ch}$ (or $N_{p,x}$, $N_{p,oh}$) is the (total) number of processing channels. This modified version of the GRU is termed Peak GRU (or Peak GRU RNN) in the following (see further below). The Peak GRU may be seen as a modified version of the Delta GRU described by [Neil et al.; 2018]. The number of (actually) processed channels may be limited to (even) less than $N_p$ channels by further (power saving) measures, e.g. to discard (the processing/updating of) values among the $N_p$ largest values of a given time step that are smaller than or equal to a threshold value. The estimated values $\hat{x}(k,t-1)$ and $\hat{h}(k,t-2)$ may be equal to the last value of x and h respectively, that caused a change having a numerical value among the $N_p$ largest changes at the time instance t' in question.

The number of channels (nodes) $N_{ch}$ ($N_{ch,x}$; $N_{ch,oh}$) may be equal ($N_{ch}=N_{ch,x}=N_{ch,oh}$) or different for the input vector (x) ($N_{ch,x}$) and the output (hidden state) vector (o, h, where $h(t)=o(t)$) ($N_{ch,oh}$). Likewise, for the Peak GRU, the number of peak values $N_p(N_{p,x}, N_{p,oh})$ may be equal ($N_p=N_{p,x}=N_{p,oh}$) or different for the input vector (x) ($N_{p,x}$) and the output (hidden state) vector (o,h) ($N_{p,oh}$). The number of frequency sub-hand channels K provided by the input unit may be equal to ($K=N_{ch}$) or different from the number of processing channels $N_{ch}$ ($N_{ch,x}$; $N_{ch,oh}$) of the Delta GRU/Peak GRU layer (goes for the baseline GRU as well). Hence, although the channel index of the Delta GRU/Peak GRU layer is generally indicated as being one (k, equal to the frequency sub-band channel index), it may in practice be different (and different for input (x) and output vectors (o, h) of the Delta GRU/Peak GRU layer). The (maximum) range of variation for the frequency sub-band channel index, k, is e.g. 1≤k≤K. The (maximum) range of variation for the Delta GRU/Peak GRU channel index, k, is e.g. $1 \leq k \leq N_{ch}$, if the number of input and output nodes of the Delta GRU/Peak GRU layer is identical and $1 \leq i \leq N_{ch,x}$ and $1 \leq j \leq N_{ch,oh}$, respectively, if the number of input and output nodes of the Delta GRU/Peak GRU layer are different. Instead of using k as a general 'channel index', indices i and j may be used for input and output (and hidden state) vectors, respectively, cf. e.g. equations (5)', (6)', (7)' and (8)' below for the Peak GRU.

The number of peak values $N_p$ ($N_{p,x}$, $N_{p,ch}$) for the Peak GRU may be fixed. The number of peak values $N_p$ ($N_{p,x}$, $N_{p,oh}$) may be dynamically determined, e.g. in dependence of the at least one electric input signal (e.g. in dependence of characteristics thereof, e.g. modulation, level, estimated signal to noise ratio, etc.).

The number of input nodes may e.g. be equal to the number of frequency channels of the input signal (an input vector may e.g. represent a frame of the input signal), or to a multiple of the number of frequency channels. The number of input nodes may e.g. be in the range from 16 to 500. The number of output nodes may e.g. be equal to the number of frequency channels of the input signal, or to a fraction of that number. The number of output nodes may e.g. be in the range from 1 to 500, e.g. from 1 to 150. The number of input and output nodes may be identical.

The number of layers in the neural network may be larger than two. The number of 'hidden' layers may be larger than or equal to two, such as larger than or equal to three, e.g. in the range from two to ten.

The number of layers implemented as a modified gated recurrent unit according to the present disclosure may be larger than or equal to one, such as larger than or equal to two, e.g. in the range from one to three, e.g. in the range from one to ten. All layers of the neural network may be modified GRU layers.

The modified gated recurrent unit according to the present disclosure may e.g. be used in audio or video processing applications, e.g. in such applications where (low) power consumption is an important parameter, e.g. in body-worn electronic devices, such as hearing aids or headsets or handheld video processing devices.

In the present disclosure, the use of the modified GRU is exemplified in relation to noise reduction (e.g. SNR to gain conversion, etc.) in an audio processing device, e.g. a hearing device. The modified GRU may, however, be used in other applications, such as own voice detection, wake-word detection, keyword spotting, voice activity detection, etc. Further, the modified GRU may be used in video processing, e.g. to process video images from one frame to the next. The similarity between an audio-image (a spectrogram) and other (normal, video) images are obvious. But the audio-image (spectrogram) is different from an ordinary (video) image in that the audio-image has a time dimension. Whereas the input to the neural network from an audio processing application may be a time frame comprising a 'spectrum' of the audio signal at a given time instance and the audio-image (spectrogram) is built by concatenated sequential time frames, the input to the neural network from a video processing application may be a sequence of images (where each image represents a particular time instance, and where the sequence of images provides the time dimension.

A Hearing Device Comprising the Modified Gated Recurrent Unit

In an aspect, a hearing device, e.g. a hearing aid or a headset, is provided. The hearing device may be configured to be worn by a user at or in an ear or to be fully or partially implanted in the head at an ear of the user comprises an input unit for providing at least one electric input signal in a time-frequency representation and a signal processor comprising a neural network configured to provide respective gain values G(k,t) in said time-frequency representation for reducing noise components in said at least one electric input signal. The neural network comprises at least one layer defined as a modified delta gated recurrent unit, termed Peak GRU, comprising memory in the form of a hidden state vector h, and wherein an output vector o is provided by said Peak GRU in dependence of an input vector x and said hidden state vector h, wherein an output o(j,t) of the Peak GRU at given time step t is stored as said hidden state h(j,t) and used in the calculation of the output o(j,t+1) in the next time step t+1. The signal processor is configured to provide that the number of updated channels among $N_{ch}$ ($N_{ch,x}$; $N_{ch,oh}$) processing channels of the Peak GRU for said input vector x(t) and said hidden state vector h(t−1) at said given time instance t is limited to a number of peak values $N_p$($N_{p,x}$, $N_{p,oh}$) where $N_p$($N_{p,x}$, $N_{p,oh}$) is smaller than $N_{ch}$ ($N_{ch,x}$; $N_{ch,oh}$). The signal processor is configured to execute the neural network comprising a modified gated recurrent unit according to the present disclosure. A method of operating the hearing device is further disclosed.

A First Hearing Device

In an aspect of the present application, a hearing is provided. The hearing device may comprise
an input unit for providing at least one electric input signal in a time-frequency representation k, t, where k and t are frequency and time indices, respectively, and k represents a frequency sub-band signal, k=1, . . . , K, the at least one electric input signal being representative of sound and comprising target signal components and noise components; and
a signal processor comprising
a an SNR estimator for providing a target signal-to-noise ratio (SNR) estimate SNR(k,t) for said at least one electric input signal, or a signal originating therefrom, in said time-frequency representation;
an SNR-to-gain converter for converting said target signal-to-noise ratio estimates SNR(k,t) to respective gain values G(k,t) in said time-frequency representation,
wherein said signal processor comprises a neural network comprising at least one layer defined as a gated recurrent unit, the gated recurrent unit comprising memory in the form of a hidden state vector h, and wherein an output vector o(t) is provided by said gated recurrent unit in dependence of an input vector x(t) and said hidden state vector h(t−1), wherein said output o(t) at a given time step t is stored as said hidden state h(t) and used in the calculation of the output vector o(t+1) in the next time step t+1. The hearing device may configured to provide that at least said SNR-to-gain converter is implemented by said neural network, and wherein said at least one layer defined as a gated recurrent unit is implemented as a modified gated recurrent unit, wherein the signal processor is configured—at a given time instance t—to calculate changes $\Delta x(i,t)=x(i,t)-\hat{x}(i,t-1)$, and $\Delta h(j,t-1)=h(j,t-1)-\hat{h}(j,t-2)$ to the input vector x(t) and to the hidden state vector h(t−1), respectively, from one time instance, t−1, to the next, t, and where $\hat{x}(i,t-1)$ and $\hat{h}(j,t-2)$ are estimated values of x(i,t1) and h(j,t−2), respectively, where indices i,j refers to the $i^{th}$ input neuron and the $j^{th}$ neuron of the hidden state, respectively, where $1 \leq i \leq N_{ch,x}$ and $1 \leq j \leq N_{ch,oh}$, wherein $N_{ch,x}$ and $N_{ch,oh}$ is the number of processing channels of the input vector x and the hidden state vector h, respectively, and wherein the signal processor is further configured to provide that the number of updated channels among said $N_{ch,x}$ and said $N_{ch,oh}$ processing channels of the modified gated recurrent unit for said input vector x(t) and said hidden state vector h(t−1), respectively, at said given time instance t is limited to a number of peak values $N_{p,x}$ and $N_{p,oh}$, respectively, where $N_{p,x}$ is smaller than $N_{ch,x}$, and $N_{p,oh}$ is smaller than $N_{ch,oh}$.

The input vector of the neural network may be based on or comprise said target signal-to-noise ratio (SNR) estimate SNR(k,t) for said at least one electric input signal, or a signal originating therefrom. The output vector of the neural network comprises a gain (G(k,t)) of a noise reduction algorithm.

Thereby an improved hearing device may be provided.

A method of operating the first hearing device is further disclosed (by converting the structural features of the first hearing device to process features).

A Second Hearing Device

In an aspect of the present application, a hearing device is provided. The hearing device comprises
   an input unit for providing at least one electric input signal in a time-frequency representation k, t, where k and t are frequency and time indices, respectively, and k represents a frequency channel, k=1, . . . , K, K>1, the at least one electric input signal being representative of sound and comprising target signal components and noise components,
   a signal processor connected to the input unit and configured to receive the at least one electric input signal or a signal originating therefrom, the signal processor being configured to determine respective gain values G(k,t) in said time-frequency representation, which when applied to said at least one electric input signal or to one or more signals originating therefrom reduce said noise components relative to said target signal components, wherein the signal processor comprises a neural network comprising at least one layer defined as a gated recurrent unit in the form of a modified gated recurrent unit,
   wherein the signal processor is configured—at a given time instance t—to calculate changes $\Delta x(i,t)=x(i,t)-\hat{x}(i,t-1)$, and $\Delta h(j,t-1)=h(j,t-1)-\hat{h}(j,t-2)$ to an input vector x(t) and to the hidden state vector h(t−1), respectively, from one time instance, t−1, to the next, t, and where $\hat{x}(i,t-1)$ and $\hat{h}(j,t-2)$ are estimated values of x(i,t−1) and h(j,t−2), respectively, where indices i, j refers to the $i^{th}$ input neuron and the $j^{th}$ neuron of the hidden state, respectively, where $1 \leq i \leq N_{ch,x}$ and $1 \leq j \leq N_{ch,oh}$, wherein $N_{ch,x}$ and $N_{ch-oh}$ is the number of processing channels of the input vector x and the hidden state vector h, respectively, and
   wherein the signal processor is further configured to provide that the number of updated channels among said $N_{ch,x}$ and said $N_{ch,oh}$ processing channels of the modified gated recurrent unit for said input vector x(t) and said hidden state vector h(t−1), respectively, at said given time instance t is limited to a number of peak values $N_{p,x}$, and $N_{p,oh}$, respectively, where $N_{p,x}$ is smaller than $N_{ch,x}$, and $N_{p,oh}$, is smaller than $N_{ch,oh}$.

The input vector of the neural network may be based on or comprise said at least one electric input signal, or a signal originating therefrom. The output vector of the neural network comprises a gain (G(k,t)) of a noise reduction algorithm.

A method of operating the second hearing device is further disclosed (by converting the structural features of the second hearing device to process features).

A Third Hearing Device

In an aspect of the present application, a hearing device is provided. The hearing device comprises
   an input unit for providing at least one electric input signal in a time-frequency representation k, t, where k and t are frequency and time indices, respectively, and k represents a frequency channel, k=1, . . . , K, K>1, the at least one electric input signal being representative of sound and comprising target signal components and noise components,
   a signal processor connected to the input unit and configured to receive the at least one electric input signal or a signal originating therefrom, the signal processor comprising
      a target signal estimator for providing an estimate of the target signal;
      a noise estimator for providing an estimate of the noise;
      a gain estimator for providing respective gain values in dependence of said target signal estimate and said noise estimate, wherein said gain estimator comprises a neural network, wherein the weights of the neural network have been trained with a plurality of training signals, and wherein the outputs of the neural network comprise real or complex valued gains, or separate real valued gains and real valued phases;
   wherein the signal processor is configured—at a given time instance t—to calculate changes $\Delta x(i,t)=x(i,t)-\hat{x}(i,t-1)$, and $\Delta h(j,t-1)=h(j,t-1)-\hat{h}(j,t-2)$ to an input vector x(t) and to the hidden state vector h(t−1), respectively, from one time instance, t−1, to the next, t, and where $\hat{x}(i,t-1)$ and $\hat{h}(j,t-2)$ are estimated values of x(i,t−1) and h(j,t−2), respectively, where indices i, j refers to the $i^{th}$ input neuron and the $j^{th}$ neuron of the hidden state, respectively, where $1 \leq i \leq N_{ch,x}$ and $1 \leq j \leq N_{ch,oh}$, wherein $N_{ch,x}$ and $N_{ch,oh}$ is the number of processing channels of the input vector x and the hidden state vector h, respectively, and
      wherein the signal processor is further configured to provide that the number of updated channels among said $N_{ch,x}$ and said $N_{ch,oh}$ processing channels of the modified gated recurrent unit for said input vector x(t) and said hidden state vector h(t−1), respectively, at said given time instance t is limited to a number of peak values $N_{p,x}$, and $N_{p,oh}$, respectively, where $N_{p,x}$ is smaller than $N_{ch,x}$, and $N_{p,oh}$, is smaller than $N_{ch,oh}$.

The input vector x(t) may be based on or comprise said estimate of the target signal and said estimate of the noise, or a signal or signals originating therefrom. The output vector of the neural network comprises a gain (G(k,t)) of a noise reduction algorithm.

A method of operating the third hearing device is further disclosed (by converting the structural features of the third hearing device to process features).

Features of the Hearing Device(s) (and Corresponding Methods)

The following features are intended to be combinable with the above first, second and third hearing devices.

The hearing device may be adapted to provide that the number of processed channels is limited to less than $N_{p,x}$ and $N_{p,oh}$ channels by further discarding the processing of values among the $N_{p,x}$ and $N_{p,oh}$ largest values, respectively, in a given time step that are smaller than or equal to a threshold value.

The hearing device may be adapted to provide that the estimated values $\hat{x}(k,t-1)$ and $\hat{h}(k,t-2)$ are equal to the last value of x and h respectively, that caused a change having a numerical value among the $N_{p,x}$ and $N_{p,oh}$ largest changes, respectively, at the time instance t' in question.

The modified gated recurrent unit according to the present disclosure is termed 'Peak GRU' or 'Peak GRU RNN'. The term the 'number of peak values $N_{p,x}$ and $N_{p,oh}$, respectively,' at a given time instance t is in the present context taken to mean the $N_{p,x}$ and $N_{p,oh}$, respectively, largest values of a parameter related to said input vector and said hidden state at time instance t (or t−1 for the hidden state h). The number of peak values $N_{p,x}$ and $N_{p,oh}$, may be equal ($N_{p,x}=N_{p,oh}$). The processing channel index is denoted i in connection with the input vector x and j in connection with the hidden state vector h (to indicate that the processing channel index is varied independently from 1 to $N_{ch,x}$ and from 1 to $N_{ch,oh}$, respectively, if the number of input nodes $N_{ch,x}$ is different from the number of output (or hidden state) nodes $N_{ch,oh}$ of the Delta GRU RNN or Peak GRU RNN layer. For simplicity, this is however not generally applied to all the expressions of the present disclosure, where k may be used as a common 'channel index'. The estimated values ($\hat{x}(t)$, $\hat{h}(t-1)$) of the input vector x(i,t) and the hidden state vector h(j,t−1) are memorized from one time step to the next (e.g. so that $\hat{x}(i,t-1)$ and $\hat{h}(j,t-2)$ are available in time step t in order to be able to determine $\Delta x(i,t)$ and $\Delta h(i,t-1)$, see e.g. FIG. 1C. The estimated values $\hat{x}(i,t-1)$ and $\hat{h}(j,t-2)$ may be equal to values of x and h at least one time step earlier. The estimated values $\hat{x}(i,t-1)$ and $\hat{h}(j,t-2)$ may be stored in memory and used in the calculations at time step t. The estimated values $\hat{x}(i,t-1)$ and $\hat{h}(j,t-2)$ may be equal to the last value of x and h respectively, causing an 'above-threshold' change (from one time step to the next), i.e. not (necessarily) the difference since the last time step. The estimated values $\hat{x}(i,t-1)$ and $\hat{h}(j,t-2)$ may be equal to the last value of x and h respectively, that caused a change having a numerical value among the $N_p$ ($N_{p,x}$, $N_{p,oh}$) largest changes at the time instance t' in question. The term "the number of updated channels among said $N_{ch,x}$ and said $N_{ch,oh}$ processing channels of the modified gated recurrent unit (i.e. the Peak GRU) for said input vector x(t) and said hidden state vector h(t−1), respectively, at said given time instance t is limited to a number of peak values $N_{p,x}$ and $N_{p,oh}$, respectively, where $N_{p,x}$ is smaller than $N_{ch,x}$, and $N_{p,oh}$ is smaller than $N_{p,oh}$" is taken to mean that (at least) the ($N_{ch,x}$, $N_{p,x}$) values of $\Delta x(i,t)$ and the ($N_{ch,oh}-N_{p,oh}$) values of $\Delta h(j,t-1)$ other than said $N_p$ largest values are set to zero in the calculations of the Peak GRU unit in the given time step (t). In other words, the number of processed channels in a given time step is maximally $N_p$. The term 'the number of updated channels' is in the present context taken to mean those channels for which an output value o(k,t) and thus the hidden state value h(k,t) may change in a given time step (compared to the respective values of the previous time step). Each neuron (channel) transmits its value, only when the absolute value of the change ($\Delta x(k,t)$ and $\Delta h(k,t-1)$ is 'above threshold', e.g. in that it exceeds a threshold and/or is among the $N_p$ ($N_{p,x}$, $N_{p,oh}$) largest values. In other words, the estimated values $\hat{x}(i,t-1)$ and $\hat{h}(j,t-2)$ may be equal to the values at the last change fulfilling the peak (and/or threshold) criterion (and may only be stored in such case).

The estimated values $\hat{x}(i,t-1)$ and $\hat{h}(j,t-2)$ may be viewed as states. These states store the $i^{th}$ input and the hidden state of the $j^{th}$ neurons, respectively, at their last change. The current input x(i,t) and state h(j,t) will be compared against these values to determine the $\Delta x$ and $\Delta h$, respectively. Then the $\hat{x}(i,t-1)$ and $\hat{h}(j,t-2)$ values will only be updated if the threshold is crossed (cf. [Neil et al.; 2018]), or in the sense of the present disclosure if the $|x(i,t)-\hat{x}(i,t-1)|$ and $|h(j,t-1)-\hat{h}(j,t-2)|$ values are among peak values and/or above a threshold value.

The signal processor may be configured to determine said estimated values of the input vector and the hidden state vector as $$\hat{x}(i, t) = \begin{cases} x(i, t), & \text{if } |x(i, t) - \hat{x}(i, t-1)| \text{ is among the } N_{p,x} \text{ largest values across } i \\ \hat{x}(i, t-1) & \text{otherwise} \end{cases}$$

$$\hat{h}(j, t-1) = \begin{cases} h(j, t-1), & \text{if } |h(j, t-1) - \hat{h}(j, t-2)| \text{ is among the } N_{p,oh} \text{ largest values across } j \\ \hat{h}(j, t-2) & \text{otherwise} \end{cases}$$

where indices i, j refers to the $i^{th}$ input neuron and the $j^{th}$ neuron of the hidden state, respectively, where $1 \leq i \leq N_{ch,x}$ and $1 \leq j \leq N_{ch,oh}$. As mentioned, the number of peak values may be equal $N_{p,oh}=N_{p,x}=N_p$, and the number of channels may be equal $N_{ch,x}=N_{ch,oh}=N_{ch}$.

The signal processor may be configured to determine said changes to values of the input vector and the hidden state vector as $$\Delta x(i, t) = \begin{cases} x(i, t) - \hat{x}(i, t-1), & \text{if } |x(i, t) - \hat{x}(i, t-1)| \text{ is among the } N_{p,x} \text{ largest values across } i \\ 0 & \text{otherwise} \end{cases}$$

$$\Delta h(j, t-1) = \begin{cases} h(j, t-1) - \hat{h}(j, t-2), & \text{if } |h(j, t-1) - \hat{h}(j, t-2)| \text{ is among the } N_{p,oh} \text{ largest values across } j \\ 0 & \text{otherwise} \end{cases}$$

If the number of input nodes is different from the number of output or hidden state nodes of the Peak GRU RNN layer, indices i and j instead fulfil $1 \leq i \leq N_{ch,x}$ and $1 \leq j \leq N_{ch,oh}$, respectively, in the above expressions. If the number of peak values is different for the input vector and the output vector and thus the hidden state vector, the above delta values should correspondingly relate to $N_{p,x}$ and $N_{p,oh}$, respectively, in the above expressions.

The input unit may comprise a multitude of input transducers and a beamformer filter, wherein the beamformer filter is configured to provide said at least one electric input signal based on signals from said multitude of input transducers. The beamformer filter may provide the at least one electric input signal as a spatially filtered signal based on the signals from the multitude of input transducers and pre-determined or adaptively determined beamformer weights.

The hearing device may comprise a voice activity detector configured to estimate whether or not, or with what probability, an input signal comprises a voice signal at a given point in time, and to provide a voice activity control signal indicative thereof. An estimate of a current noise level may e.g. be provided at times when the voice activity control signal indicates an absence of speech. The output of the voice activity detector may be used by the beamformer filter. An absolute or relative acoustic transfer function from a sound source to (each of) the input transducers of the hearing device (when worn by the user) may be estimated when the voice activity control signal indicates the of speech (e.g. other than from the user).

The hearing device may comprise an output unit configured to provide output stimuli to the user in dependence of said at least one electric input signal.

The input unit may comprise at least one input transducer, e.g. a microphone. The input unit may comprise at least one analogue to digital converter for providing the at least one electric input signal as a digitized signal. The input unit may comprise at least one analysis filter bank configured to provide the at least one electric input signal as frequency sub-band signals (in a time-frequency representation (k,t) (or (k,l) or (k,m), where t and l and m are equivalent time indices). The output unit may comprise a synthesis filter bank configured to convert a processed signal in a time-frequency representation (frequency sub-band signals) to a time domain signal. The output unit may comprise a digital to analogue converter for converting a digitized signal (comprising digital samples) to an analogue electric signal. The output unit may comprise an output transducer configured to provide the output stimuli to the user. The output transducer may comprise a loudspeaker or a vibrator. The output transducer may comprise an implanted part, e.g. a multi-electrode array configured to electrically stimulate the cochlear nerve at an ear of the user.

The signal processor may be configured to apply the gain values G(k,t) provided by the SNR-to-gain converter to the at least one electric input signal, or to a signal derived therefrom. The signal processor may comprise a combination unit (e.g. a multiplier) to apply the gain values G(k, t) to the at least one electric input signal IN(k,t) (or to a signal derived therefrom) and to provide a noise reduced signal. The signal processor may be configured to process the at least one electric input signal (or a signal derived therefrom) or the noise reduced signal and to provide a processed signal. The signal processor may be configured to apply a compression algorithm configured to compensate for a user's hearing impairment.

Other configurations and input features may as well be possible. The Peak GRU may as well be used for direction of arrival estimation, feedback path estimation, (own) voice activity detection, or other scene classification, etc.

The signal processor may be configured to discard processing of a channel among said $N_p$ channels at a given time instant t in case its absolute value $|x(t)-\hat{x}(t-1)|$ or $|h(t-1)-\hat{h}(t-2)|$ is smaller than a threshold value $\Theta_p$. Thereby a combination of the Delta GRU RNN and Peak GRU RNN algorithms is provided. This provides the benefit of the non-processing of small values in case even the selected peak values are (numerically) small. Thereby an upper limit on the processing power is maintained, while providing that the processing, power may be lower, in case the signal variations are small. The number of peak values may be different for the input vector and the hidden state vector. Likewise the threshold value $\Theta_p$ may be different for the input vector and the hidden state (e.g. $\Theta_{p,x}$ and $\Theta_{p,oh}$, respectively). In case that the changes (e.g. $x(t)-\hat{x}(t-1)$) are asymmetric, two different thresholds may be applied ($\Theta_{p,x+}$, $\Theta_{p,x-}$), e.g. depending on whether we have $x(t)-\hat{x}(t-1)$ is greater or smaller than 0. The thresholds ($\Theta_p$, or $\Theta_{p,x+}$, $\Theta_{p,x-}$) may e.g. depend on a given detected sound scene. Such appropriate thresholds may be estimated during training. The above feature of discarding processing of channels exhibiting values smaller than a threshold may also be combined with the Statistical RNN (StatsRNN) discussed further below.

The number of peak values $N_{p,x}$ and $N_{p,oh}$, respectively, may be adaptively determined in dependence of the at least one electric input signal. The at least one electric input signal may e.g. be evaluated over a time period. The number of peak values $N_p$ (or $N_{p,x}$ and $N_{p,oh}$, respectively) may be constant for a given acoustic environment (e.g. for a given program of a hearing aid). The hearing aid or headset may comprise a classifier of the acoustic environment. The number of peak values at a given time may be dependent on a control signal from the acoustic environment classifier indicative of the current acoustic environment. The number of peak values $N_p$ (or $N_{p,x}$ and $N_{p,oh}$, respectively) may be different for the changes ($\Delta x$) to the input and for the changes ($\Delta h$) to the hidden state.

Parameters of the neural network may be trained with a plurality of training signals. A neural network comprising the Peak GRU RNN algorithm according to the present disclosure may be trained with a baseline GRU RNN algorithm providing optimal weights for a trained network (e.g. weight matrices ($W_{xr}$, $W_{hr}$, $W_{xc}$, $W_{hc}$, $W_{xu}$, $W_{hu}$, cf. FIG. 1A, 1C). The optimized weights may then be stored in the hearing device, and the Peak GRU constraints may be applied to the trained network. The neural network may be trained on examples of estimated signal-to-noise ratios as input obtained from a noisy input mixture and its corresponding (known) output as a vector across frequency of a noise-reduced input signal mainly containing the desired signal. The neural network may be trained on examples of (digitized) electric input signals IN(k,t), e.g. directly from an analysis filter bank (cf. e.g. FB-A in FIG. 3A, 3B), for which corresponding SNR's and appropriate gains are known (or for which appropriate gains are known, if the SNR-estimator form part of the neural network, FIG. 3B).

The hearing device may be constituted by or comprise an air-conduction type hearing aid, a bone-conduction type hearing aid, a cochlear implant type hearing aid, or a combination thereof. The hearing aid may be configured to be worn by a user at or in an ear, or to be fully or partially implanted in the head at an ear of the user. The hearing device may be constituted by or comprise a headset.

The hearing device may comprise a hardware block specifically adapted to process elements of the gated recurrent unit as vectorized operations. The hardware block may e.g. form part of an integrated circuit, e.g. a digital signal processor (DSP) of the hearing device. The hardware block may be configured to operate on a set of values (a vector) at one time, e.g. in groups of $N_{pro}$, e.g. $N_{pro}$=four elements. A decision to process or discard all elements of the set may be based on a logic operation, e.g. involving the values of the individual elements of the set of values (vector). A decision to process or discard may e.g. comprise determining whether or not at least one of (such as a majority of) the values are above a threshold value (e.g. among the top $N_p$ values). A different number of peak values $N_p$ ($N_{p,x}$, $N_{p,oh}$) may be used for the input and hidden state vectors. If this is the case, the entire vector (all $N_{pro}$, e.g. four, values) is processed. If not, all $N_{pro}$ values are discarded. In the example of the present disclosure related to audio processing, the set of $N_{pro}$ values may represent a subset of elements in a vector representing a spectrum (the individual elements of the vector representing values of frequency bands of the spectrum at a given point in time). It is then important to consider how the individual frequency bands are grouped in (sub-)vectors. Grouping the frequency bands in the original order (band 1, 2, 3, 4, etc., $N_{ch}$=e.g. 64 or 128, or 512 bands) could result in losing, e.g. lower frequency, information if most values within the vector would be too small. Therefore, regrouping may be performed (e.g. based on experiments).

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid or a headset). The output transducer may comprise a vibrator for providing the stimulus as mechanical vibration of a skull bone to the user (e.g. in a bone-attached or bone-anchored hearing aid).

The hearing, device comprises an input unit for providing at least one electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic, signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system may be adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form. The directional signal may be based on microphones from hearing instruments in a binaural setup. The estimated SNR may depend on a binaural signal.

The hearing device may comprise antenna and transceiver circuitry (e.g. a wireless receiver) for wirelessly receiving a direct electric input signal (e.g. an audio signal) from another device, e.g. from an entertainment device (e.g. a TV-set), a communication device (e.g. a telephone), a wireless microphone, or another hearing device. In general, a wireless link established by antenna and transceiver circuitry of the hearing device can be of any type. The wireless link may be established between two devices, e.g. between a communication device and the hearing device, or between two hearing devices, e.g. via a third, intermediate device (e.g. a processing device, such as a remote-control device, a smartphone, etc.). Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, e.g. less than 20 g.

The hearing device may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing device may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing devices may comprise a digital-to-analogue (DA) converter to convert a digital signal to an analogue output signal, e.g. for being, presented to a user via an output transducer.

The hearing device, e.g. the input unit, and or the antenna and transceiver circuitry comprise(s) a TF-conversion unit for providing a time-frequency representation of an input signal. The time-frequency representation may comprise an array or nap of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device my be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device. A mode of operation may include a communication mode, e.g. a telephone mode.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating, whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles anchor bones, e.g. due to speech or chewing (e.g. jaw movement) and to provide a detector signal indicative thereof. Sensor signals (or signals derived from sensor signals) may as well be used as input features to the Peak GRU.

The hearing device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

The classification unit may be based on or comprise a neural network (e.g. a recurrent neural network), e.g. a trained neural network.

The hearing device may comprise an acoustic (and/or mechanical) feedback control (e.g. suppression) or echo-cancelling system.

The hearing device may further comprise other relevant functionality for the application in question, e.g. compression, noise reduction, voice activity detection, e.g. own-voice detection and/or estimation, keyword detection, etc.

The hearing device may comprise a hearing aid, such as a hearing instrument, e.g. a hearing instrument adapted for being located at the ear or fully or partially in the ear canal of a user, e.g. a headset, an earphone, an ear protection device or a combination thereof.

Use

In an aspect, use of a hearing device as described above, in the 'detailed description of embodiments' and in the claims, is moreover provided. Use may be provided in a device or system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

Methods of Operating an Audio or Video Processing Device

In an aspect, a method of operating an audio or video processing device, e.g. a hearing device, such as a hearing aid or a headset, is provided. The audio or video processing device comprises at least an input unit and a signal processor for processing outputs of the input unit and for providing a processed output, the signal processor comprising a neural network comprising at least one layer implemented as a modified gated recurrent unit (modified (SRU) comprising memory in the form of a hidden state vector (h(t−1)). The method comprises
  providing by the input unit at least one electric input signal in a time-frequency representation k, t, where k and t are frequency and time indices, respectively, and k represents a frequency channel, k=1, . . . , K, the at least one electric input signal being representative of sound or image data; and
  providing an input vector x(t) to the at least one layer implemented as a gated recurrent unit (GRU) based on or comprising said at least one electric input signal, or a signal originating therefrom;
  calculating by the signal processor—at a given time instance t—changes $\Delta x(i,t)=x(i,t)-\hat{x}(i,t-1)$, and $\Delta h(j,t-1)=h(j,t-1)-\hat{h}(j,t-2)$ to the input vector x(t) and to the hidden state vector h(t−1), respectively, from one time instance, t−1, to the next, t, and where $\hat{x}(i,t-1)$ and $\hat{h}(j,t-2)$ are estimated values of x(i,t−1) and h(j,t−2), respectively, where indices i, j refers to the $i^{th}$ input neuron and the $j^{th}$ neuron of the hidden state, respectively, where $1 \leq i \leq N_{ch,x}$ and $1 \leq j \leq N_{ch,oh}$, wherein $N_{ch,x}$ and $N_{ch,oh}$ is the number of processing channels of the input vector x and the hidden state vector h, respectively; and
  providing by the signal processor that the number of updated channels among said $N_{ch,x}$ and said $N_{ch,oh}$ processing channels of the modified gated recurrent unit for said input vector x(t) and said hidden state vector h(t−1), respectively, at said given time instance t is limited to a number of peak values and $N_{p,x}$, and $N_{p,oh}$, respectively, where $N_{p,x}$ is smaller than $N_{ch,x}$, and $N_{p,oh}$, is smaller than $N_{ch,oh}$;
  calculating, by the signal processor—at a given time instance t—an output vector o(t) from the at least one layer implemented as a gated recurrent unit (GRU) in dependence of said input vector x(t) and said hidden state vector h(t−1), and wherein the output o(t) at a given time step t is stored as the hidden state h(t) and used in the calculation of the output vector o(t+1) in the next time step t+1;
  wherein the processed output is determined by the signal processor in dependence of said output vector o(t) or a signal originating therefrom; and
  wherein the processed output is used for controlling processing in the audio or video processing device and/or transmitted by the audio or video processing device to another device.

In a further aspect, a method of operating a video processing device, e.g. a portable video processing device, is provided. The video processing device comprises at least an input unit and a signal processor for processing outputs of the input unit and for providing a processed output, the signal processor comprising a neural network comprising at least one layer implemented as a modified gated recurrent unit (modified GRU) comprising memory in the form of a hidden state vector (h(t−1)). The method comprises
  providing by the input unit successive digital images representing a video sequence, each image being associated with a specific time instance (t), and the subsequent image representing the image at a later time instance (t+1), each image comprising a multitude of pixels, which together constitute the image, and wherein changes to the image from one time instance to the next are represented by changes to one or more of said multitude of pixels; and
  providing an input vector x(t) to the at least one layer implemented as a gated recurrent unit (GRU) based on or comprising said image associated with said specific time instance (t), or a signal originating therefrom;
  calculating, by the signal processor—at a given time instance t—changes $\Delta x(i,t)=(i,t)-\hat{x}(i,t-1)$, and $\Delta h(j,t-1)=h(j,t-1)-\hat{h}(j,t-2)$ to the input vector x(t) and to the hidden state vector h(t−1), respectively, from one time instance, t−1, to the next, t, and where $\hat{x}(i,t-1)$ and $\hat{h}(j,t-2)$ are estimated values of x(i,t−1) and h(j,t−2), respectively, where indices i, refers to the $i^{th}$ input neuron and the $j^{th}$ neuron of the hidden state, respectively, where $1 \leq i \leq N_{ch,x}$ and $1 \leq j \leq N_{ch,oh}$, wherein $N_{ch,x}$ and $N_{ch,oh}$ is the number of processing channels of the input vector x and the hidden state vector h; respectively; and
  providing by the signal processor that the number of updated channels among said $N_{ch,x}$ and said $N_{ch,oh}$ processing channels of the modified gated recurrent unit for said input vector x(t) and said hidden state vector h(t−1), respectively, at said given time instance t is limited to a number of peak values $N_{p,x}$, and $N_{p,oh}$, respectively, where $N_{p,x}$ is smaller than $N_{ch,x}$, and $N_{p,oh}$, is smaller than $N_{ch,oh}$;
  calculating, by the signal processor—at a given time instance t—an output vector o(t) from the at least one layer implemented as a gated recurrent unit (GRU) in dependence of said input vector x(t) and said hidden state vector h(t−1), and wherein the output o(t) at a given time step t is stored as the hidden state h(t) and used in the calculation of the output vector o(t+1) in the next time step t+1;
  wherein the processed output is determined by the signal processor in dependence of said output vector o(t) or a signal originating therefrom; and
  wherein the processed output is a modified version of said successive digital images representing a video sequence, or is used for controlling processing in video processing device, and/or is transmitted by the video processing device to another device.

The methods may in general be useful for processing of data, e.g. data representing time variant processes, e.g. audio or video processing, or video sequences represented by a multitude of subsequent images (or frames). It may be particularly advantageous in applications where processing power is limited, and e.g. where (significant) changes in data from one time step to the next are limited, e.g. to less than 20% of the data. Such examples occur in video images from one frame to the next or in audio data, e.g. represented by a spectrogram from one timeframe to the next. In audio processing, the method may e.g. be useful for tasks such as noise reduction (as exemplified in the present application), voice activity detection, own voice detection, own voice estimation, wake-word detection, keyword spotting, etc.

Methods of Operating a First and a Second Hearing Device

In an aspect, a method of operating a hearing device, e.g. a hearing aid or a headset, is provided. The method comprises
  providing at least one electric input signal in a time-frequency representation k, t, where k and t are frequency and time indices, respectively, and k represents a frequency channel, k=1, . . . , K, the at least one electric input signal being representative of sound and comprising target signal components and noise components; and either
  providing a target signal-to-noise ratio (SNR) estimate SNR(k,t) for said at least one electric input signal, or a signal originating therefrom, in said time-frequency representation; and
  converting said target signal-to-noise ratio estimates SNR(k,t) to respective gain values G(k,t) in said time-frequency representation, or
  converting said at least one electric input signal to respective gain values G(k,t) in said time-frequency representation.
The method further comprises
  providing a neural network comprising at least one layer defined as a gated recurrent unit, the gated recurrent unit comprising memory in the form of a hidden state vector h, and wherein an output vector o(t) is provided by said gated recurrent unit in dependence of an input vector x(t) and said hidden state vector h(t−1), wherein said output o(t) at a given time step t is stored as said hidden state h(t) and used in the calculation of the output vector o(t+1) in the next time step t+1.
The method may comprise that either the converting said target signal-to-noise ratio estimates SNR(k,t) to respective gain values G(k,t) in said time-frequency representation, or the converting said at least one electric input signal to respective gain values G(k,t) in said time-frequency representation, is implemented by said neural network, wherein said at least one layer defined as a gated recurrent unit is implemented as a modified gated recurrent unit, and wherein the method further comprises
  determining changes $\Delta x(i,t)=x(i,t)-\hat{x}(i,t-1)$, and $-h(j,t-1)=h(j,t-1)-\hat{h}(j,t-2)$ to the input vector x(t) and to the hidden state vector h(t−1), respectively, from one time instance, t−1, to the next, t, and where $\hat{x}(i,t-1)$ and $\hat{h}(j,t-2)$ are estimated values of x(i,t−1) and h(i,t−2), respectively, where indices i, j refers to the $i^{th}$ input neuron and the $j^{th}$ neuron of the hidden state, respectively, where $1 \leq i \leq N_{ch,x}$ and $1 \leq j \leq N_{ch,oh}$, wherein $N_{ch,x}$ and $N_{ch,oh}$ is the number of processing channels of the input vector x and the hidden state vector h, respectively, and
  wherein the signal processor is further configured to provide that the number of updated channels among said $N_{ch,x}$ and said $N_{ch,oh}$ processing channels of the modified gated recurrent unit for said input vector x(t) and said hidden state vector h(t−1), respectively, at said given time instance t is limited to a number of peak values $N_{p,x}$, and $N_{p,oh}$, respectively, where $N_{p,x}$ is smaller than $N_{ch,x}$, and $N_{p,oh}$, is smaller than $N_{ch,oh}$.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The input vector (x(t)) may be based on or comprise said target signal-to-noise ratio (SNR) estimate (SNR(k,t)) for said at least one electric input signal, or a signal originating therefrom. The input vector (x(t)) may be based on or comprise said at least one electric input signal, or a signal originating therefrom.

The method may, e.g., before operating the hearing device, comprise training parameters of the neural network with a plurality of training signals.

A Computer Readable Medium or Data Carrier

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program

A computer program (product) comprising instructions which, when the program is executed by a computer, cause the computer to carry out (steps of) the method described above, in the 'detailed description of embodiments' and in the claims is furthermore provided by A Data Processing System In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System

In a further aspect, a hearing system comprising a hearing device as described above, in the 'detailed description of embodiments', and in the claims, AND an auxiliary device is moreover provided.

The hearing system may be adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing device(s). The function of a remote control may be implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device. The hearing system may comprise two hearing devices adapted to implement a binaural hearing system, e.g. a binaural hearing aid system.

An APP

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. The APP may be configured to run on cellular phone, e.g. a smartphone, or on another portable device allowing communication with said hearing device or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 2B shows an exemplary neural network for converting an input signal representing sound to a gain (cf. IN2G block in FIG. 3B) for attenuating noise, the neural network comprising a gated recurrent unit (GRU) layer, FIG. 3A schematically illustrates an input part of a hearing aid or a headset comprising a noise reduction system comprising an SNR estimator and an SNR-to-gain block, the latter being implemented by a neural network (e.g. as shown in FIG. 2A), and FIG. 3B schematically illustrates an input part of a hearing aid or a headset comprising a noise reduction system comprising an input signal-to-gain block, the latter being implemented by a neural network (e.g. as shown in FIG. 2B), FIG. 4A schematically shows a first embodiment of a hearing aid or a headset according to the present disclosure comprising an input part as illustrated in FIG. 3A, and FIG. 4B schematically shows a second embodiment of a hearing aid or a headset according to the present disclosure comprising an input part as illustrated in FIG. 3B, FIG. 5A schematically shows a third embodiment of a hearing aid or a headset according to the present disclosure, and FIG. 5B schematically shows a fourth embodiment of a hearing aid or a headset according to the present disclosure.

The figures are schematic and simplified for clarity, and they just show details which are essential to the understanding of the disclosure, while other details are left out. Throughout, the same reference signs are used for identical or corresponding parts.

Figure 1A:
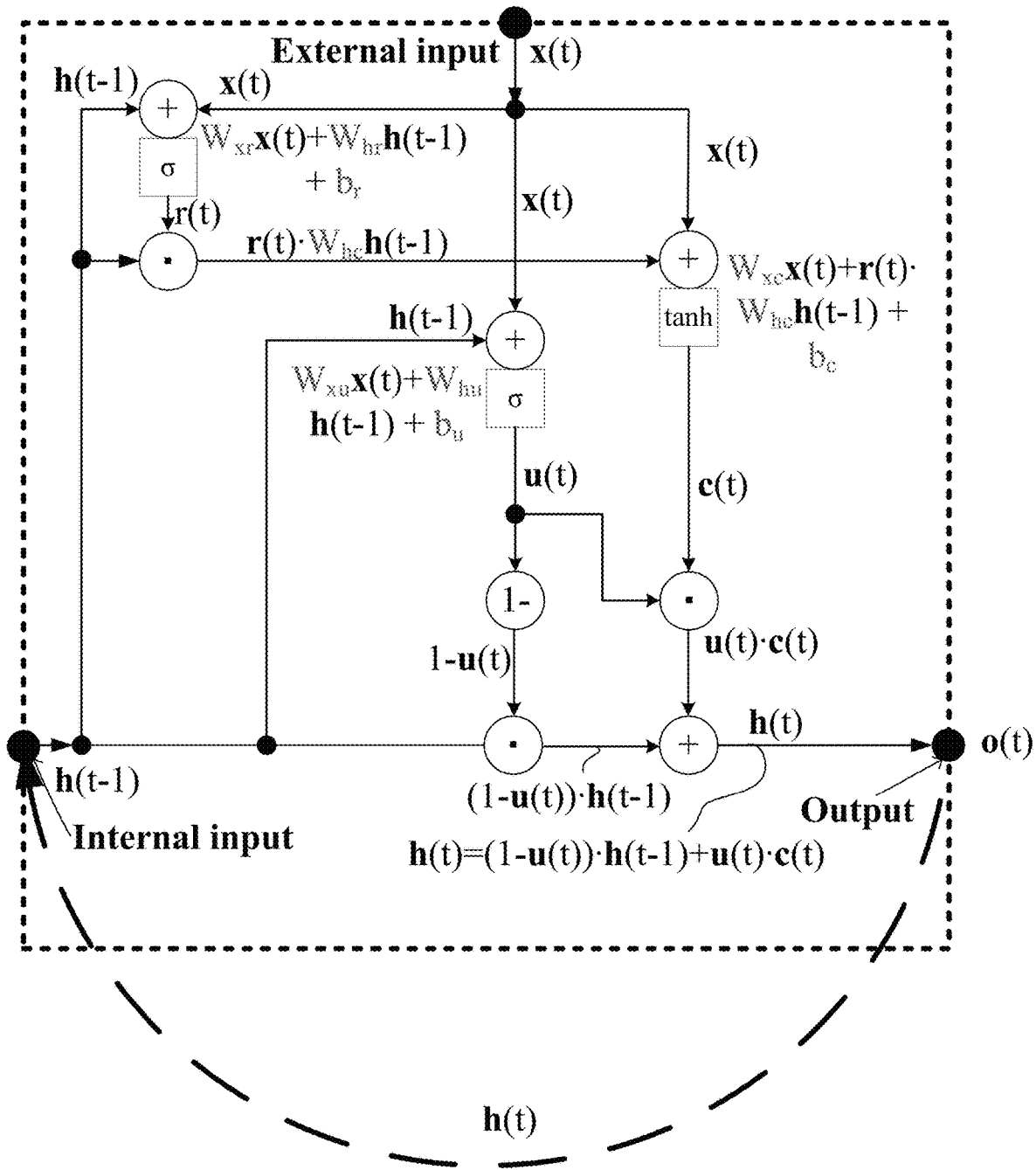
FIG. 1A shows a first graphical illustration of the computations required for implementing a basic gated recurrent unit (GRU)

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of signal processing, e.g. audio and/or image processing, in particular to the use of neural networks in audio processing, specifically to algorithms implementing learning algorithms or machine learning techniques in (e.g. portable) audio processing devices.

So-called learning algorithms, e.g. in the form of neural networks, have found increasing application in all sorts of signal processing tasks, including (natural) speech processing in hearing aids or headsets. In a hearing aid, noise reduction is a key feature in solving the problem of providing or increasing a user's (e.g. a hearing-impaired user's) access to an acceptable perception of speech and other sounds in the environment. In the present disclosure, a (e.g. deep) neural network (NN, DNN) is applied to the task of determining a postfilter gain of a single-channel noise reduction system of a hearing aid or headset. The postfilter is configured to reduce remaining noise in a spatially filtered signal. The spatially filtered signal is e.g. determined as a linear combination of a multitude of electric input signals, e.g. from microphones of the hearing aid or headset. A postfilter with this purpose has been implemented in different ways, e.g. as a Wiener filter (or a modification thereof). The use of neural networks to implement the postfilter has been proposed in the prior art, see e.g. EP3694229A1.

In hearing aids or headsets or similar portable audio processing, devices, a) small size, b) low latency, and c) low power consumption, are important design parameters. Hence 'power efficiency' of processing algorithms is paramount. The low-power requirement limits the type and size of the neural networks that are feasible, e.g. in a hearing aid, and thus the functional tasks that are suitable for being implemented by such networks. In practice, the number of network parameters are limited to of the order of 10,000 (with current processing power in a hearing aid). This number is expected to increase with time (e.g. due to developments in the field of integrated circuits).

The present disclosure deals with a (single- or multi-layer) recurrent neural network (RNN) architecture comprising memory and so-called gated recurrent units (GRU). Although attractive from a functional point of view, such networks may, however, be computationally rather demanding and not generally applicable in practice in low-power applications, such as portable electronic devices, e.g. audio processing devices, such as hearing aids or headsets, or the like. An attempt to limit the processing complexity of this kind of neural network, a Recurrent Neural Network (RNN) architecture, called a delta network, has been proposed (cf. e.g. [Neil et al.; 2018]. In the Delta Recurrent Neural Network (Delta RNN), each neuron transmits its value only when the change in its activation exceeds a threshold. This can be particularly efficient when the signals to be processed are relatively stable over time (change relatively slowly). This is e.g. the case for some audio and video signals.

Even the Delta RNN might not be suitable for use in a low-power (portable) device, such as a hearing aid, or the like, because the amount of operations performed by the network may be substantial. Above all, however, the amount of operations is unknown, because it will depend on the input signals to the network and the threshold parameter(s).

The present disclosure proposes a modification to the Delta RNN.

In the following, the modified so-called Peak GRU RNN is described. But first key elements of baseline GRU and Delta RNN are outlined.

A baseline GRU, a Delta GRU, or a Peak GRU RNN may be used as a single layer (recurrent) neural network.

A baseline deep neural network (DNN) consists of several layers. A deep neural network comprises at least one (hidden) layer between an input and an output layer (to be termed a DNN). At least one of the layers may comprise a gated recurrent unit (GRU), e.g. a Peak GRU according to the present disclosure.

Baseline GRU performs computations on all inputs (see e.g. FIG. 1A), while the Peak GRU scheme according to the present disclosure may skip computation of some of the inputs. Since focus of the present disclosure is low power, a way to reduce the amount of computations and thus save power, while still maintaining sufficient performance (audio quality), is sought for.

Sparsity (e.g. zeros) in network activations or input data (i.e. sparsity in network parameters (weights, bias, or non-linear function) or sparsity in input data to the network, respectively) is a property that can be used to achieve high power efficiency. By ignoring computations involving zeros, computational complexity (and thus power) can be reduced.

The basic parts of the gated recurrent units GRU are the following (adapted from section 2.1. of [Neil et al.; 2018]):

Gated Recurrent Units (GRU)

The GRU neuron model has two gates—a reset gate r and an update gate u—and a candidate hidden state c. The reset gate r determines the amount of information from the previous hidden state that will be added to the candidate hidden state c. The update gate u decides to what extent the activation h should be updated by the candidate hidden state c to enable a long-term memory. The GRU formulation is shown below:

$$r(t)=\sigma[W_{xr}x(t)+W_{hr}h(t-1)+b_r] \quad (1)$$

$$u(t)=\sigma[W_{xu}x(t)+W_{hu}h(t-1)+b_u] \quad (2)$$

$$c(t)=\tanh[W_{xc}x(t)+r(t)\odot(W_{hc}h(t-1))+b_c] \quad (3)$$

$$h(t)=(1-u(t))\odot h(t-1)+u(t)\odot c(t) \quad (4)$$

where x is the (external) input vector, h the activation vector, W the weight matrix, b the bias, σ signify logistic sigmoid function, and ⊙ indicates element-wise multiplication. The data flow of the GRU node model is schematically illustrated in FIG. 1A, 1B (adapted from [Kostadinov; 2017]).

FIG. 1A represents all computations required for GRU node as written out in eq. (1)-(4).

Figure 1B:
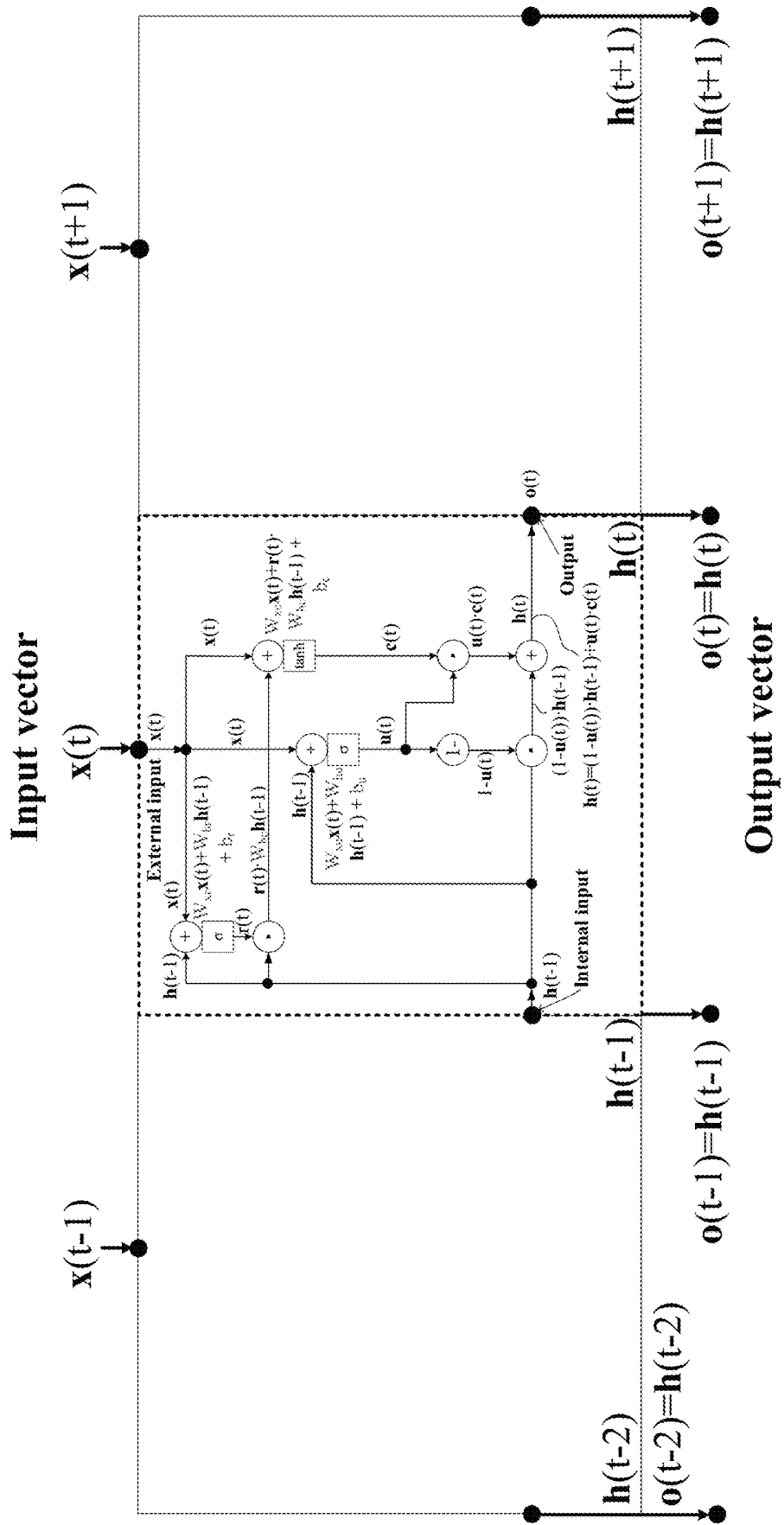
FIG. 1B shows a second graphical illustration of the computations required for implementing a basic GRU.

The parameter x(t) is the (external) input and the parameter h(t) is the output (also denoted o(t) in FIG. 1A, 1B, 2) of the GRU that will be used as an input to a possible next layer (e.g. a fully connected on cf. e.g. FIG. 2A, 2B), cf. bold, curved dashed arrow denoted h(t) in FIG. 1A from output o(t) to internal input h(t−1). In other words, the parameter h reflects a memory of past output value(s) of the network. In the drawings, the (external (x, o) and internal (h)) input and output parameters are shown as bold face to indicate a 'feature vector'. In the illustrated example of the present disclosure, the 'features' of the 'feature vector' is embodied in values of the parameter in question at different frequencies k, k=1, . . . , K (where K may be equal to or different from the number of processing channels $N_{ch}$ of the GRU), cf. e.g. FIG. 2A, 2B. In the example of FIG. 2A, the input vector to the neural network comprising the (Peak) GRU unit as an intermediate layer is a (K×1) input vector SNR(t) at time t represents a spectrum of a signal-to-noise-ratio (SNR) estimate at time t, wherein each element of the vector $SNR(t)^T$=(SNR(1,t), . . . , SNR(K,t)) represents an SNR-estimate at a frequency k, k=1, . . . , K at time t. The input vector x(t) to the GRU may have the same (K×1) or a different dimension ($N_{ch,x}$×1) depending on the number of output nodes preceding layer of the neural network (e.g. the fully connected layer (NN-layer) in FIG. 2A, 2B), or it may have the dimensionality of the input data (if GRU layer is the first layer and there is no other layer in front of it). At the same time, output o(t)=h(t) serves as internal input h(t−1) in the next time step for the GRU in case the processing of the GRU has not been completed (see e.g. FIG. 1B, where a time sequence t−1, t, t+1 of the calculations of a GRU cell is unfolded). Any type of neural network (feed forward, recursive, long short-term memory, gated recurrent unit, etc.) may provide an input layer and/or an output layer to the GRU (including to the Peak GRU). In FIG. 2A, 2B, a fully connected feed forward neural network is indicated as input and output layers (NN-layer) with a GRU RNN (e.g. a peak GRU RNN according to the present disclosure) as an intermediate layer.

FIG. 1A illustrates how the GRU computes the output (using equations (1)-(4) above. The main components are the two gates (reset r and update u), and a candidate state c that are described below in more details.

Update Gate u

In the update gate a, input x(t) is multiplied with its corresponding weights represented by matrix $W_{xu}$ ($W_{xu}$x(t).

In the examples of the present disclosure the weight matrices $W_{xu}$, $W_{hu}$, etc., are K×K matrices, where K is the number of frequency bands (e.g. K=$N_{ch}$) of the input signals to the GRU. In general, however, the dimension of the weight matrices is adapted to the specific case in dependence of the dimension of the input and output vectors of the GRU. If e.g. there are 64 inputs and 256 outputs (dimensionality of the hidden state), then the kernels (matrix) for X ($W_{xu}$, etc.) will have dimensions 64×256 each, the dimensionality of H matrices ($W_{hu}$, etc.) will be 256×256 each. The same applies to h(t−1) that is multiplied with matrix $W_{hu}$ ($W_{hu}$(t−1)), where h(t−1) contains information from the previous time step. Both results are added together ($W_{xu}$x(t)+$W_{hu}$h(t−1)) (and possibly further a bias parameter $b_u$ added) and a sigmoid activation function (σ) is applied to limit the result to be between 0 and 1 (u(t)=σ[$W_{xu}$x(t)+$W_{hu}$h(t−1)+$b_u$]), see equation (2). Other activation functions than sigmoid may be applied.

Reset Gate r

The reset gate r is used to decide how much of the previous information should be forgotten. The formula is the same as it was for the update gate except for the weight matrices ($W_{xr}$, $W_{hr}$) and a possible bias parameter ($b_r$) that are different (r(t)=σ[$W_{xr}$x(t)+$W_{hr}$h(t−1)+$b_r$]), see equation (1).

Candidate State c

Like previously, the multiplications with inputs ($W_{xc}$x(t)) and ($W_{hc}$h(t−1)) are performed (see equation (3)). Then the element-wise product (r(t)⊙($W_{hc}$h(t−1))) with reset gate determines what information will be removed from previous time steps. The closer the value of r to 0, the more the information will be forgotten. Finally (after optionally adding a bias $b_c$), the tanh activation function, limiting the results in a range between −1 and 1, is applied (c(t)=tanh[$W_{xc}$x(t)+r(t)⊙($W_{hc}$h(t−1))+$b_c$]). Other activation functions than tanh may be applied.

Hidden State h

The last step is to calculate the hidden state h(t) that holds information for the current unit. In order to obtain h(t), the update gate (u) is needed. The update gate determines what to keep from both the current memory content (c) and previous memory content h(t−1). Therefore, we again need to perform element-wise multiplications, (1−u(t))⊙h(t−1), and u(t)⊙c(t)—this time using the update gate u(t). Finally, we sum the results and obtain h(t) (h(t)=(1−u(t))⊙h(t−1)+u(t)⊙c(t)) that will serve as an input to both the next layer and the next time step (cf. e.g. FIG. 1B).

The baseline idea of the Gated recurrent unit (GRU) is common for both the Delta GRU RNN and the Peak GRU RNN approaches. The Peak GRU RNN is derived from the Delta GRU RNN method, and they have many calculations in common.

FIG. 1B shows a second graphical illustration of the computations required for implementing a basic GRU, wherein a GRU unit as shown in FIG. 1A and described above is 'folded out' to indicate the time sequence (t−1, t, t+1) and illustrate the presence of a memory in the GRU (as opposed to a feed-forward type neural network). Three successive GRU ('cells') representing time instances t−1, t, t+1, respectively, are coupled together to illustrate how the output value(s) (o=h) is used as input to the next cell (next time step). Input (feature) vector x may be a physical entity vector (e.g. a time frame of an audio or video signal) or it may serve to receive an output vector from a (possible) previous neural network layer that may be a GRU layer or any other type of neural network layer. Likewise, the output (feature) vector o may be a resulting vector for use in an audio or video application (e.g. a frequency dependent gain vector to be applied to a (noisy) input signal) or it may serve to provide input to a further neural network layer that may be a GRU layer or any other type of neural network layer.

The basic parts of the Delta GRU RNN are the following (adapted from section 2.2. of [Neil et al.; 2018]):

Delta GRU RNN Algorithm

The Delta GRU RNN algorithm reduces both memory access and arithmetic operations by exploiting the temporal stability of RNN inputs, states and outputs. Computations associated with a neuron activation that has a small amount of change from its previous time step can be skipped. Skipping a single neuron saves multiplications of an entire column in all related weight matrices (cf. e.g. weight matrices ($W_{xr}$, $W_{hr}$, $W_{xc}$, $W_{hc}$, $W_{xu}$, $W_{hu}$) of the GRU as described above) as well as fetches of the corresponding weight elements. In a Matrix-Vector Multiplication (M×V) between a neuron activation vector (e.g. x or h) and a weight matrix (W), zero elements in the vector result in zero partial sums that do not contribute to the final result.

The largest elements would be determined and placed in delta vectors ($\Delta x$, $\Delta h$). The smallest elements would be skipped in hardware (set to 0 in the equations). These delta vectors are then used for multiplications with matrices. So instead of the original (e.g. for the external input x(t)) $W_{xr}x(t)$ for the reset state r we will get $W_{xr}\Delta x(t)$, where $\Delta x(t)$ is sparse. The same goes for the activation h.

The key feature of the Delta GRU RNN is that it updates the output of a neuron only when the neuron's activation changes by more than a delta threshold $\Theta$. To skip the computations related to any small $\Delta x(t)$, the delta threshold $\Theta$ is introduced to decide when a delta vector element can be ignored. The change of a neuron's activation is only memorized when it is larger than $\Theta$. Furthermore, to prevent the accumulation of error with time, only the last activation value that has a change larger than the delta threshold is memorized. This is defined by the following equation sets (node indices have been omitted):

$$\hat{x}(t) = \begin{cases} x(t), & \text{if } |x(t) - \hat{x}(t-1)| > \Theta \\ \hat{x}(t-1), & \text{if } |x(t) - \hat{x}(t-1)| \leq \Theta \end{cases} \quad (5)$$

$$\hat{h}(t-1) = \begin{cases} h(t-1), & \text{if } |h(t-1) - \hat{h}(t-2)| > \Theta \\ \hat{h}(t-2), & \text{if } |h(t-1) - \hat{h}(t-2)| \leq \Theta \end{cases} \quad (6)$$

$$\Delta x(t) = \begin{cases} x(t) - \hat{x}(t-1), & \text{if } |x(t) - \hat{x}(t-1)| > \Theta \\ 0, & \text{if } |x(t) - \hat{x}(t-1)| \leq \Theta \end{cases} \quad (7)$$

$$\Delta h(t-1) = \begin{cases} h(t-1) - \hat{h}(t-2), & \text{if } |h(t-1) - \hat{h}(t-2)| > \Theta \\ 0, & \text{if } |h(t-1) - \hat{h}(t-2)| \leq \Theta \end{cases} \quad (8)$$

where the last changes ($\hat{x}(t)$, $\hat{h}t-1$)) are memorized and used as internal inputs in the next time cycle (t+1, see FIG. 1C), whereas delta vectors $\Delta x(t)$ and $\Delta h(t-1)$ are calculated every time step t by using estimates $\hat{x}(t-1)$ and $\hat{h}(t-2)$ of previous values. The $\Theta$-threshold values in eq. (5) and (6) or (7) and (8) may be identical and may be identical over frequency as well. The $\Theta$-values may, however, be different, e.g. different for x($\Delta x$)(eq. (5), (7)) and h ($\Delta h$) (eq. (6), (8)). The current input $x_{i,t}$(x(t)) (where i is the $i^{th}$ element (node) of input vector x) and state $h_{j,t}$ (h(t)) (where j is the $j^{th}$ element (node) of hidden state vector h) will be compared (e.g. subtracted) against these values to determine respective $\Delta$-values. Then the $\hat{x}_{i,t-1}$ and $\hat{h}_{j,t-a}$ values will only be updated if the threshold is crossed. Indices i, j have been omitted in the formula (5)-(8) above.

In a modified Delta asymmetric thresholds may be applied. In another modified Delta GRU, different thresholds across different neurons in a layer may be applied.

Next, using equations (5), (6), (7) and (8), the conventional GRU equation set ((1)-(4) above) can be transformed into its delta network version:

$$M_r(t) = W_{xr}\Delta x(t) + W_{hr}\Delta h(t-1) + M_r(t-1) \quad (9)$$

$$M_u(t) = W_{xu}\Delta x(t) + W_{hu}\Delta h(t-1) + M_u(t-1) \quad (10)$$

$$M_{xc}(t) = W_{xc}\Delta x(t) + M_{xc}(t-1) \quad (11)$$

$$M_{hc}(t) = W_{hc}\Delta h(t-1) + M_{hc}(t-1) \quad (12)$$

$$r(t) = \sigma[M_r(t)] \quad (13)$$

$$u(t) = \sigma[M_u(t)] \quad (14)$$

$$c(t) = \tanh[M_{xc}(t) + r(t) \odot M_{hc}(t)] \quad (15)$$

$$h(t) = (1 - u(t)) \odot h(t-1) + u(t) \odot c(t) \quad (16)$$

where $M_r$, $M_u$, $M_{xc}$, and $M_{hc}$ refer to stored (memory) values for the reset gate (r), the update gate (u), the candidate state (c), and the hidden state (h), respectively, and where $M_r(0) = b_r$, $M_u(0) = b_u$, $M_{xc}(0) = b_c$, and $M_{hc}(0) = 0$. The above processing relations for time index t (denoted eq. (9) to (18)) are graphically illustrated in FIG. 1C. The values $M_r(t-1)$, $M_u(t-1)$, $M_{xc}(t-1)$, $M_{hc}(t-1)$ in the left part of the drawing for the previous time instance (t-1) are stored in the preceding processing cycle (and typically overwritten with the new values of said parameters for use in the following processing cycle).

There may e.g. be 6 different weight matrices in Delta G-RU (other representation may be possible). These could be $W_{xr}$, $W_{hr}$, $W_{xu}$, $W_{hu}$, $W_{xx}$, and $W_{hc}$, (see also FIG. 1A). The x and h denote whether the matrices are related to x or h input, and u, r, c mean update, reset, candidate, respectively. The sub-indices are used to distinguish what input-matrix pair the output comes from. If we write $W_{xr}$, we know that this matrix will be used in computations with input vector x and is related to reset gate (see e.g. $M_r(t)$ obtained in equation (9) is used in the reset gate (r) calculation in equation (13)).

In summary, the Delta GRU RNN algorithm sets a specific threshold $\Theta$, such as 0.1 (cf. $\Theta$ in the equations (5)-(8) above), that will be used for comparisons with the element values. If the value (absolute value of the subtraction) of the currently processed element is below this threshold, the element will not be used far further computations in that time step—it will be skipped (set to 0). The number of elements that will further be processed can hence vary from one time step to another depending on their value.

Peak GRU RNN

The Peak GRU RNN—a modified version of GRU and Delta GRU RNN—according to the present disclosure is described in the following.

An advantage of the Peak GRU RNN algorithm is that it reduces computations in a deterministic manner (i.e. it is always known in advance how many operations will be performed by a given configuration of the algorithm). This is achieved by setting a hard limit that will determine how many values (peaks) should be processed in each input feature vector to the Peak GRU RNN (e.g. in each time frame of an audio or video signal). Instead of (as in Delta GRU) setting a threshold on the rate of change of the elements of the input vector, one chooses a pre-determined number ($N_p$) of elements to process in each iteration. Thus, also only $N_p$ columns of the involved matrix (e.g. $W_{xr}$, $W_{hr}$, $W_{xu}$, $W_{hu}$, $W_{xc}$, $W_{hc}$) are required. In each iteration the $N_p$ elements of the input vector with the largest rate of change (delta) are chosen for further processing. This allows flexibility in not having to process the whole vector matrix multiplication, yet also being deterministic (overall $N_p$ dot products). The Peak GRU RNN (as well as the Delta GRU RNN, if e.g. there are no zeros in the (delta) input vector) can perform the whole vector matrix multiplication (e.g. $N_p=N_{ch}$), or a subset thereof, down to zero multiplications (e.g. $N_p=0$). The threshold value, $N_p$, corresponds to the number of largest absolute values/magnitudes of the (delta) input vector ($\Delta x(t)$, $\Delta h(t-1)$) to the Peak GRU RNN layer that should (or may be) be processed. As indicated above, the number of peak values $N_p$ ($N_{p,x}$, $N_{p,oh}$) may be equal ($N_p=N_{p,x}=N_{p,oh}$) or different for the input vector (x) ($N_{p,x}$) and the output (and hidden state) vector (o, h) ($N_{p,oh}$).

Updating the neurons corresponding to the (e.g. $N_p$) largest deltas ($\Delta x$, $\Delta h$) assumes that all neurons are equally salient. The deltas may, however, be weighted by a 'saliency' factor, where the factor is related to the resulting change of a cost function during training, see also section on 'training' below.

The weight matrices (e.g. $W_{xr}$, $W_{hr}$, $W_{xu}$, $W_{hu}$, $W_{xc}$, $W_{hc}$) of the Peak GRU RNN (and similarly of the Delta GRU RNN and the Baseline GRU RNN) are typically fixed to values optimized in a training procedure.

The lower the number of peaks, the less computations and memory accesses are necessary, and hence the lower the power consumption.

The modification is rooted in equations (5) to (8) of the Delta RNN algorithm. Instead of fulfilling the criterion that $|x(t)-\hat{x}(t-1)|$ and $|h(t-1)-\hat{h}(t-2)|$ being larger than a threshold value $\Theta$ as required by the Delta RNN algorithm, the Peak GRU RNN algorithm according to the present disclosure identifies only the $N_p$ largest values of $|x(t)-\hat{x}(t-1)|$ and $|h(t-1)-\hat{h}(t-2)|$, respectively, at a given point in time t, and only these values are processed. At different points in time, . . . , t−1, t, t+1 , . . . , the $N_p$ largest values of $|x(t)-\hat{x}(t-1)|$ and $|h(t-1)-\hat{h}(t-2)|$ may be associated with different elements in the vector/positions (indices) in the input vector and hidden state vector (e.g. different frequencies in the example of the present disclosure).

The absolute value |•| is used so that we can compare the numbers based on their magnitudes; the delta vectors are then assigned the actual result of the subtraction (the ones corresponding to their magnitudes being above the threshold). This is also valid for Delta GRU (but the number of processed values may be different).

Instead of the equations (5), (6) for the Delta GRU RNN, the following expressions may be used for the Peak GRU RNN:

$$\hat{x}_{i,t} = \begin{cases} x_{i,t} & \text{if } |x_{i,t}-\hat{x}_{i,t-1}| \text{ is among} \\ & \text{the } N_p \text{ largest values across } i, \\ \hat{x}_{i,t-1} & \text{otherwise} \end{cases} \quad (5)$$

$$\hat{h}_{i,t-1} = \begin{cases} h_{j,t-1} & \text{if } |h_{j,t-1}-\hat{h}_{j,t-2}| \text{ is among} \\ & \text{the } N_p \text{ largest values across } j, \\ \hat{h}_{j,t-2} & \text{otherwise} \end{cases} \quad (6)$$

where indices i, j refer to the $i^{th}$ input, and the hidden state of the $j^{th}$ neuron (where $1 \leq i \leq K$ and $1 \leq i \leq K$, where K is the number of frequency bands in the exemplary (input and output feature vectors) of the use case (audio processing) of the present disclosure).

Likewise, the equations (7), (8) for the Delta GRU RNN may be used for the Peak GRU RNN, including the modification related to the pre-determined number ($N_p$) of elements to process in each iteration:

$$\Delta x_{i,t} = \begin{cases} x_{i,t}-\hat{x}_{i,t-1}, & \text{if } |x_{i,t}-\hat{x}_{i,t-1}| \text{ is among} \\ & \text{the } N_p \text{ largest values across } i, \\ 0 & \text{otherwise} \end{cases} \quad (7)$$

$$\Delta h_{j,t-1} = \begin{cases} h_{j,t-1}-\hat{h}_{j,t-2}, & \text{if } |h_{j,t-1}-\hat{h}_{j,t-2}| \text{ is among} \\ & \text{the } N_p \text{ largest values across } j, \\ 0 & \text{otherwise} \end{cases} \quad (8)$$

Elements at different indices in the vector might be selected in different time steps, e.g. in time step (t−1), we can have the following exemplary vector, where the bold values were chosen (two largest peaks based on their magnitudes, $N_p=2$, $N_{ch}=5$): [1, 0, −9, 8, −4], while in time step t, we can have a vector: [2, −5, 0, 1, −1], where two other indices in the vector are chosen, because they exhibit the (numerically) largest values.

The largest values are chosen for x and h separately, which means that we will have $N_p$ peaks in $\Delta x$ and $N_p$ (or a different value $N'_p$) peaks in $\Delta h$.

In summary, the Peak GRU RNN works with a different type of limit (however, the subtractions in equations (5)-(8) above are kept). It uses a hard limit that is equal to the number of elements that should always (or maximally) be processed in every time step. The elements that will be processed are selected based on their absolute value. If we, e.g. set a number of peaks to 48 in a 64-input node system, the 64−48=16 smallest absolute values will always be skipped in every time step.

An example of the values of $x(t)-\hat{x}(t-1)$ (or $h(t-1)-\hat{h}(t-2)$) (referred to as 'Elements after subtraction') and $|x(t)-\hat{x}(t-1)|$ (or $|h(t-1)-\hat{h}(t-2)|$) (referred to as 'Elements after ABS(subtraction)') illustrating the two methods is shown below (simplified by using only 10 elements, $N_{ch}=10$):

Elements after subtraction: [0, −0.6, 0.09, 0.8, 0.1, 0, 0, −1.0, 0.05, 0.22]

Elements after ABS(subtraction): [0, 0.6, 0.09, 0.8, 0.1, 0, 0, 1.0, 0.05, 0.22]

Delta GRU RNN

If, e.g. threshold theta $\Theta=0.06$

The elements with values below or equal to 0.06 will be set to 0 (as indicated by a bold underlined zero (0) [0, −0.6, 0.09, 0.8, 0.1, 0, 0, −1.0, 0, 0.22]

Peak GRU RNN

If, e.g. the number of peaks we want to process is $N_p=6$, then we will skip 10−6=4 smallest absolute values (set to 0): [0, −0.6, −0.09, 0.8, 0.1, 0, 0, −1.0, 0, 0.22]

In this example (at this time instant), the Delta GRU method the Peak GRU method are equally computationally efficient. It illustrates the difficulty in comparing the methods, only based on the number of data values removed by the method (at a given time instant). This depends on the values of $\Theta$ and $N_p$, respectively, and the data being processed by the respective algorithm. Therefore, it is not possible to say which method is better only by looking at how many values were removed without knowing the dataset/how it impacted the final result. If we set the number of peaks in this example to e.g. 3 only, then Peak GRU RNN method would look more efficient.

Potential Advantages of Peak GRU

The Delta GRU RNN algorithm works with an actual numerical threshold that the elements are compared against. It can, therefore, happen that if all the values are above the threshold (the threshold was not set sufficiently high), all the elements will be processed and all the additional computations compared to the baseline GRU will contribute to higher power consumption instead of reducing it. It is expected that the Delta GRU RNN works well in situations where changes between the time steps are not so sudden (e.g. more silent environments).

In general, the Delta GRU sets a threshold on the rate of change of the elements of the input vector, whereas the Peak GRU chooses a predetermined number of elements from the input vector, where the chosen elements have the largest rate of change.

The Peak GRU RNN algorithm may also contribute to an increase of power consumption if the number of peaks to be skipped is not sufficiently high. However, in general, the Peak GRU RNN algorithm:
- Always cuts a specific number of elements, no matter whether they are above or below a specific numerical threshold. Therefore, compared to Delta GRU RNN, the Peak GRU RNN is deterministic, i.e. we can always define in advance how many computations will be performed/executed. This is a very important aspect for low-power devices such as hearing instruments.
- Since the Peak GRU RNN algorithm does not use a static threshold value like Delta GRU RNN, but rather works with a number of top elements only (i.e. the "numerical threshold" is dynamic and adapted every time step), it is robust to preprocessing and can process a dataset without a prior analysis of the dataset values. If we need to apply preprocessing on the data, causing the data to be changed from one representation to another (e.g. quantization, or some simple filtering, normalization, etc.), the Delta GRU threshold will not work anymore—it will have to be remapped as well. However, no additional adjustments will be required for the Peak GRU as the order of the preprocessed data elements will remain the same.
- Similarly, like the Delta GRU RNN algorithm, the Peak GRU RNN algorithm saves computations compared to the baseline GRU RNN algorithm.

An Example: An SNR to Gain Estimator

FIG. 2A schematically illustrates an exemplary neural network for converting a signal-to-noise-ratio to a gain (cf. SNR2G block in FIG. 3A), e.g. in a hearing aid. The neural network is a deep neural network comprising a gated recurrent unit (GRU) layer as a hidden layer. The deep neural network of FIG. 2A comprises respective fully connected feed forward neural network layers (NN-Layer) as input and output layers with a GRU RNN (GRU, e.g. a peak GRU RNN according to the present disclosure) as an intermediate layer. In the illustrated example, the 'features' of the 'input feature vector' to the input layer (NN-layer) are embodied in values of a signal-to-noise-ratio SNR(k,t) at different frequencies k, k=1, . . . , K. The input vector is written as a (K×1) input vector $SNR_{(t)}^T=(SNR(1,t), \ldots, SNR(K,t))$, superscript $^T$ denoting transposition, and may be seen as representing a spectrum of a signal-to-noise-ratio (SNR) estimate at time t. In the example of FIG. 2A, the output of the first input layer (NN-layer) is denoted x(t) and is the input vector to the GRU unit (GRU). The GRU input vector x(t) may be a (K×1) vector. The GRU layer provides output vector o(t), which may be a (K×1) vector. As discussed in connection with FIGS. 1A, 1B and 1C, the GRU comprises a memory of past outputs front the GRID in that output o(t)=h(t) serves as internal input h(t=1) in the next time step (see dashed arrow from o(t) to h(t−1) in FIG. 2A (see e.g. also FIG. 1B, where a time sequence t−1, t, t+1 of the calculations of a GRU cell is unfolded). The output vector o(t) of the GRU layer is fed to the output layer (NN-layer), which provides output vector $G(t)^T=(G(1,t), \ldots, G(K,t))$ representing a 'gain spectrum' corresponding to the input SNR-vector SNR(t). In the exemplary hearing aid of FIG. 4A, the gain G(t)=G(k,t), k=1, . . . , K, is applied to a signal of the forward (audio) path (thereby e.g. providing an enhanced (noise reduced) signal).

The multi dashed line arrows of the (fully connected, feedforward) input and output layers (NN-layer) of the SNR2G estimator are intended to indicate that the gain in the $k^{th}$ frequency channel (at a given point in time t) depend on at least one of the estimated SNR values, e.g. some or of all K channels, i.e. e.g.

$$G(k,t)=f(SNR(1,t), \ldots, SNR(k,t), \ldots, SNR(K,t)).$$

This property may also be inherent in the GRU-layer. In other words, the (deep) neural network according to the present disclosure may be optimized to find the best mapping front a set of SNR estimates across frequency (SNR (k,t)) to a set of frequency dependent gain values (G(k,t)).

FIG. 2B shows an exemplary neural network for converting an input signal representing sound (directly) to a gain (cf. IN2G block in FIG. 3B) for attenuating noise, the neural network comprising a gated recurrent unit (GRU) layer. Instead of having SNR estimates as inputs, the neural network of FIG. 2B takes in directly the signals from a filter bank (or processed versions thereof). FIG. 2B may thus be considered to represent an entire noise reduction system (NRS).

In FIG. 2A, 2B, fully connected feed forward neural network layers (NN-layer) are used as input and output layers 'around' the GRU RNN (GRU). Any type of neural network (feed forward, recursive, long short-term memory, gated recurrent unit, etc.) may provide an input layer and/or an output layer to the GRU (e.g. a Peak GRU according to the present disclosure). Further, the GRU need not be a hidden layer. Further, more than three layers may be used to implement the SNR2G estimator (or other functional units of an audio or video processing device).

The GRU RNN (GRU) may be a Peak GRU RNN according to the present disclosure. In the present context the number of peaks of the Peak GRU RNN algorithm corresponds to a number of channels ($N_p$) out of the total number of processing channels ($N_{ch}$), $N_p \leq N_{ch}$ that are processed by the RNN (at a given point in time). The number of (input or output) channels (e.g. $N_{ch}$ (or $N_{ch,x}$, $N_{ch,oh}$)) can be any number (larger than two), e.g. between 2 and 1024, e.g. between 4 and 512, e.g. between 10 and 500. It means that we can decide to process $N_{ch}$, $N_{ch}-1$, $N_{ch}-2$, . . . down to 0 channels in dependence of the value of $N_p$. In the context of FIG. 2A, 2B, the number of channels $N_{ch}$ of the Peak GRU layer may be equal to K, the number of frequency bands of the filter bank (FB-A), or it may be larger or smaller than K depending on the properties of the input and output layers (NN-layer) of the neural network. In the exemplary context of the present disclosure, the neural network is preferably configured to receive an input vector and to provide an output vector both having a dimension of K (as a time frame of the input signal IN(k,t) (or SNR(k,t)) and a corresponding (estimated) noise reduction gain G(k,t)). K is the number of frequency bands (e.g. 24 or 64, etc.) of the processing path of the hearing device, wherein the neural network is implemented (see e.g. FIG. 4A, 4B, 5A, 5B). As suggested above, the intermediate layers (e.g. the Peak GRU layer) may of course have other node numbers (smaller or larger than the number of input and output nodes)

The reduction of the number of channels $N_{ch}$ being processed to $N_p \leq N_{ch}$ (e.g. $N_p < N_{ch}$), e.g. the number of units (k,t) being considered (updated) at any given point in time t, will lead to power savings but, naturally, it may also have an impact on the resulting audio quality. Therefore, a reasonable number of peaks needs to be found, e.g. in dependence of the current acoustic environment. One option is to select a fixed number $N_p$, e.g. based on simulations of different acoustic environments (e.g. using speech intelligibility (SI) measures to qualify the result of a given choice of the number of peaks $N_p$). Thereby, an optimal number of peaks $N_p$ for each environment may be found (each being e.g. applied in a different hearing aid program dedicated to a given acoustic environment or listening situation, e.g. speech in noise, speech in quiet, party, music, in car, in an airplane, in an open office, in an auditorium, in a church, etc.). Alternatively, a general number of peaks $N_p$ may be found as the one that provides a maximum average SNR over all environments.

The number of peaks $N_p$ may be constant for a given application or adaptively determined in dependence of the input signal (e.g. evaluated over a time period). The number of peaks $N_p$ may be constant for a given acoustic environment (e.g. for a given program of a hearing aid). The hearing aid or headset may comprise a classifier of the acoustic environment. The number of peaks at a given time may be dependent on a control signal from the acoustic environment classifier indicative of the current acoustic environment.

To optimize the number of peaks of a given application, a simulation using a relevant data set may be performed, e.g. by increasing the number of peaks we want to skip and observe how it impacts SNR, estimated gain, speech intelligibility measures (and/or other measures). The Peak GRU RNN (and also Delta GRU RNN) have exactly the same performance as the baseline GRU when we process all the peaks and the threshold is 0 for Peak GRU RNN and Delta GRU RNN, respectively. When we start throwing out the values, the measures will, at some point, gradually start deteriorating and reach the point where the measures such as SNR will be too low and unacceptable.

An optimal number of layers of the neural network is dependent on the dataset, the complexity of the problem we are trying to solve, the number of neurons per layer, what signal we are feeding into the network, etc. 3 layers might be sufficient, it might be needed to use 4 or 5 layers etc. In the example of the present disclosure, the number of neurons per layer is kept at the number of frequency channels K. This need not be so, however.

Figure 3A:
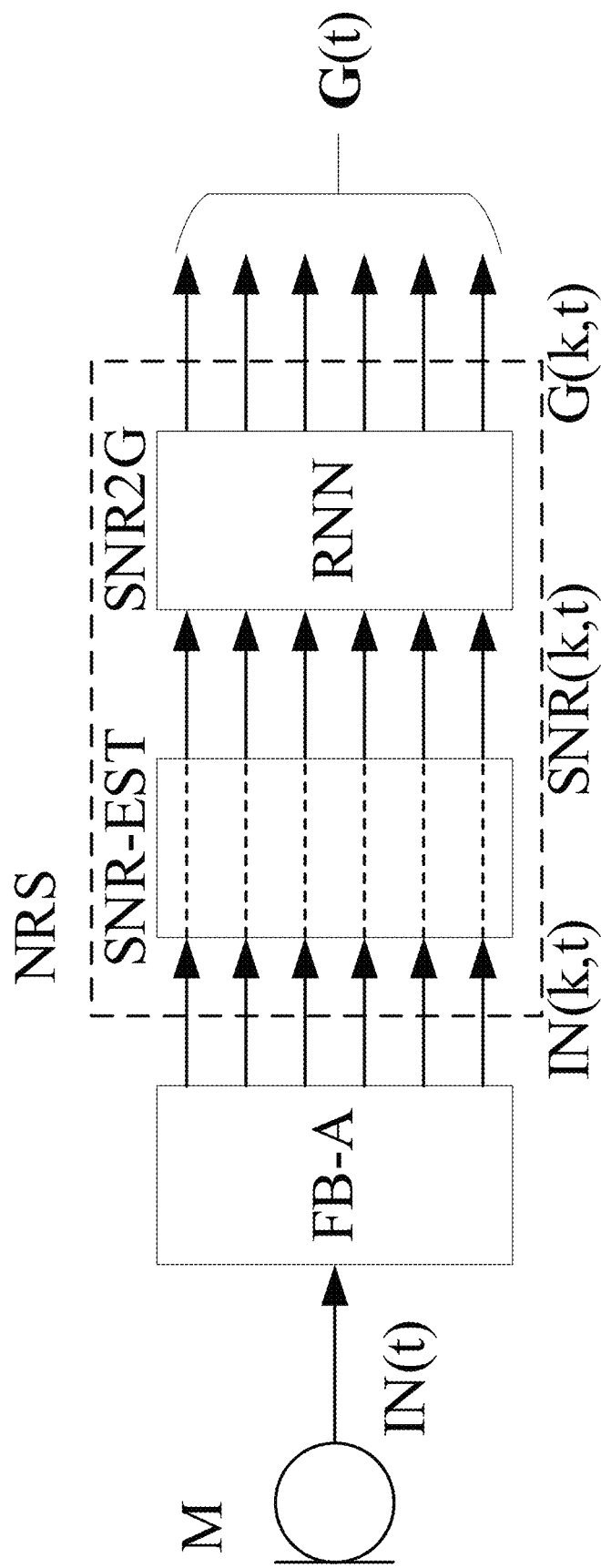

FIG. 3A schematically illustrates an input part of a hearing aid or a headset comprising a noise reduction system comprising an SNR estimator and an SNR-to-gain block, the latter being implemented by a neural network (e.g. as shown in FIG. 2A). The input part comprises an input unit comprising at least one input transducer (here a microphone (M)) for providing at least one electric input signal IN(t) and at least one analysis filter bank (FB-A) for providing the at least one electric input signal IN(t) in a time-frequency representation IN(k,t), where k and t are frequency and time indices, respectively. The frequency index k represents a frequency channel, k=1, . . . , K (e.g. FIG. 2A). The number of frequency channels may be different in different parts of the device, e.g. larger in a forward audio path than in an analysis path (or vice versa), cf. e.g. FIG. 4A, 4B (indices k, k'). The at least one electric input signal (IN(t), IN(k,t)) is representative of sound and may comprise target signal components and noise components, respectively. Target signal components are signal components originating from a sound source that may be of (current) interest to the user of the hearing aid or headset (e.g. speech from a person around the user). The input part further comprises a noise reduction system (NRS, typically part of an analysis path of the hearing aid or headset) aimed at reducing noise components in the at least one electric input signal (or in a signal originating therefrom, e.g. a spatially filtered (beamformed) signal). The noise reduction system is configured to provide a gain G(k,t) (k=1, . . . , K) intended for being applied to the electric input signal (IN(k,t) or to a signal originating therefrom), see e.g. FIG. 4A. The noise reduction gains G(k,t) (k=1, . . . , K) are adapted to reduce (attenuate) noise components, while leaving target signal components unchanged (or attenuating such components less). The noise reduction system (NRS) comprises a signal-to-noise-ratio estimator (SNR-EST) and a signal-to-noise-ratio to gain converter (SNR2G). The signal-to-noise-ratio estimator (SNR-EST) receives the at least one electric input signal (IN(k,t)) and provides an estimate of a signal-to-noise-ratio (SNR(k,t), k=1, . . . , K) of the electric input signal. The SNR-estimate (SNR(k,t)) may be based on any prior art method, e.g. determined as a ratio between the observed (available) noisy electric input signal IN(k,t) (comprising a target signal S mixed with noise N, IN(k,t)=S(k,t)+N(k,t), e.g. as picked up by one or more microphones, cf. e.g. M in FIG. 3A) divided by an estimate of the noise. The SNR-estimate may e.g. be determined as the power of the noisy signal IN(k,t) divided by the noise estimate ($\hat{N}(k,t)$) of the power of the noise signal at a given point in time (e.g. in a given time frame). In other words, SNR(k,t)·IN(k,t)/$\hat{N}(k,t_0)$, or SNR(k,t)·|IN(k,t)|$^2$/|$\hat{N}(k,t_0)$|$^2$. The index $t_0$ is intended to indicate that the (update of the) estimate of noise may be made at a time instance prior to the 'current' time instance t, e.g. in the case where the noise level is estimated when no (target) speech is (estimated to be) present in the electric input signal IN(k,t). The index $t_0$ may preferably be the latest time index before the current time index, where the noise level has been estimated.

The signal-to-noise-ratio estimator (SNR-EST) may be implemented as a neural network. The signal-to-noise-ratio estimator (SNR-EST) may be included in the signal-to-noise-ratio to gain converter (SNR2G) and implemented by a recurrent neural network according to the present disclosure. In the exemplary embodiment of FIG. 3A that would mean that the noise reduction system block (NRS) would be implemented as a recurrent neural network according to the present disclosure, e.g. receiving its input vector directly from the analysis filter bank (FB-A) as IN(k,t), e.g. on a frame by frame basis (where t represents a time frame index).

The signal-to-noise-ratio estimator (SNR-EST) provides an SNR-estimate (SNR(k,t)) to the signal-to-noise-ratio to gain converter (SNR2G, RNN). Successive time frames of the signal to noise ratio (SNR(k,t)) for the respective frequency channels (k=1, . . . , K) are used as input vectors to the SNR to gain estimator (SNR2G) implemented as a deep neural network, in particular as a Peak GRU recurrent neural network according to the present disclosure. The neural network (RNN) of the SNR to gain estimator (SNR2G, RNN) comprises an input layer, a number of hidden layers, and an output layer (see e.g. FIG. 2A). The output vector from the output layer comprises frequency dependent gains G(k,t) configured to be applied to the (e.g. digitized) electric input signal (or a signal derived therefrom) to provide a noise reduced signal (cf. e.g. signal OUT(k't) in FIG. 4A). The frequency dependent gains G(k,t) may be written as (vector) G(t)=G(k,t), k=1, . . . , K.

Figure 3B:
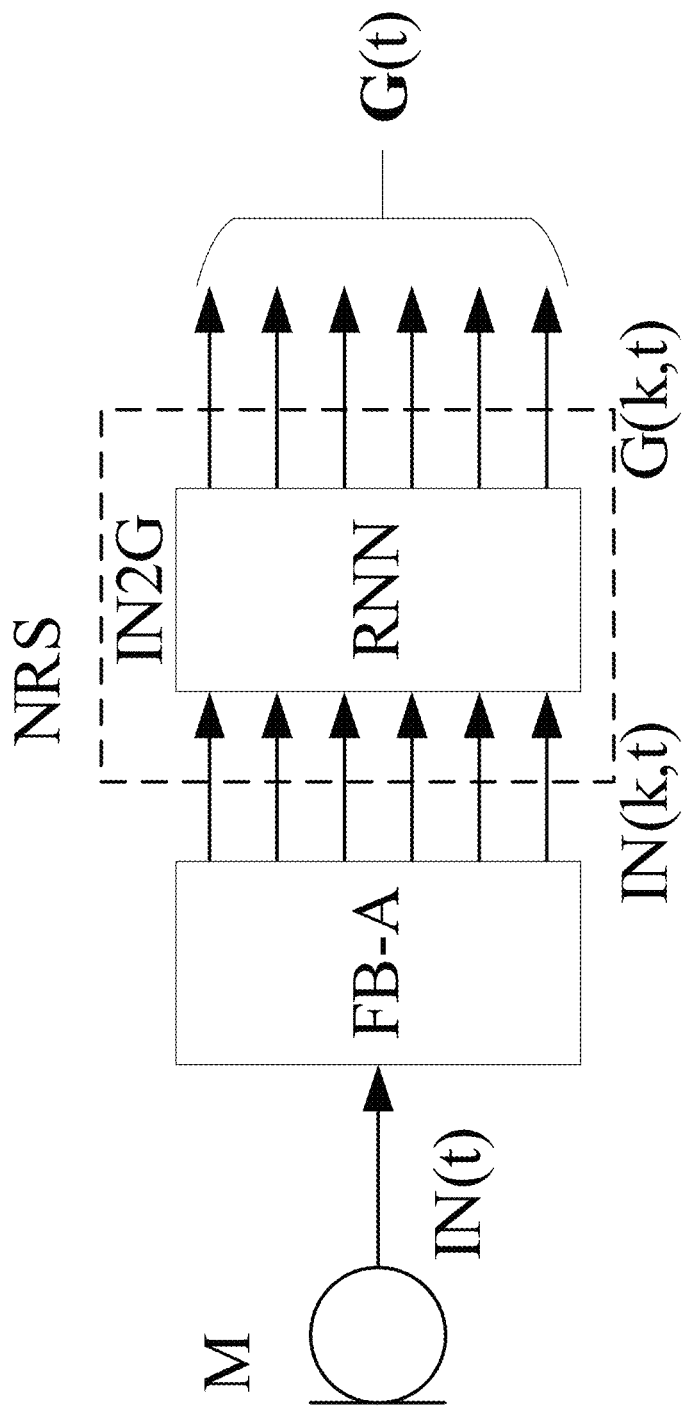

FIG. 3B schematically illustrates an input part of a hearing aid comprising a noise reduction system (NRS) comprising an input signal-to-gain block (IN2G), the latter being implemented by a neural network (e.g. as shown in FIG. 2B).

Figure 4A:
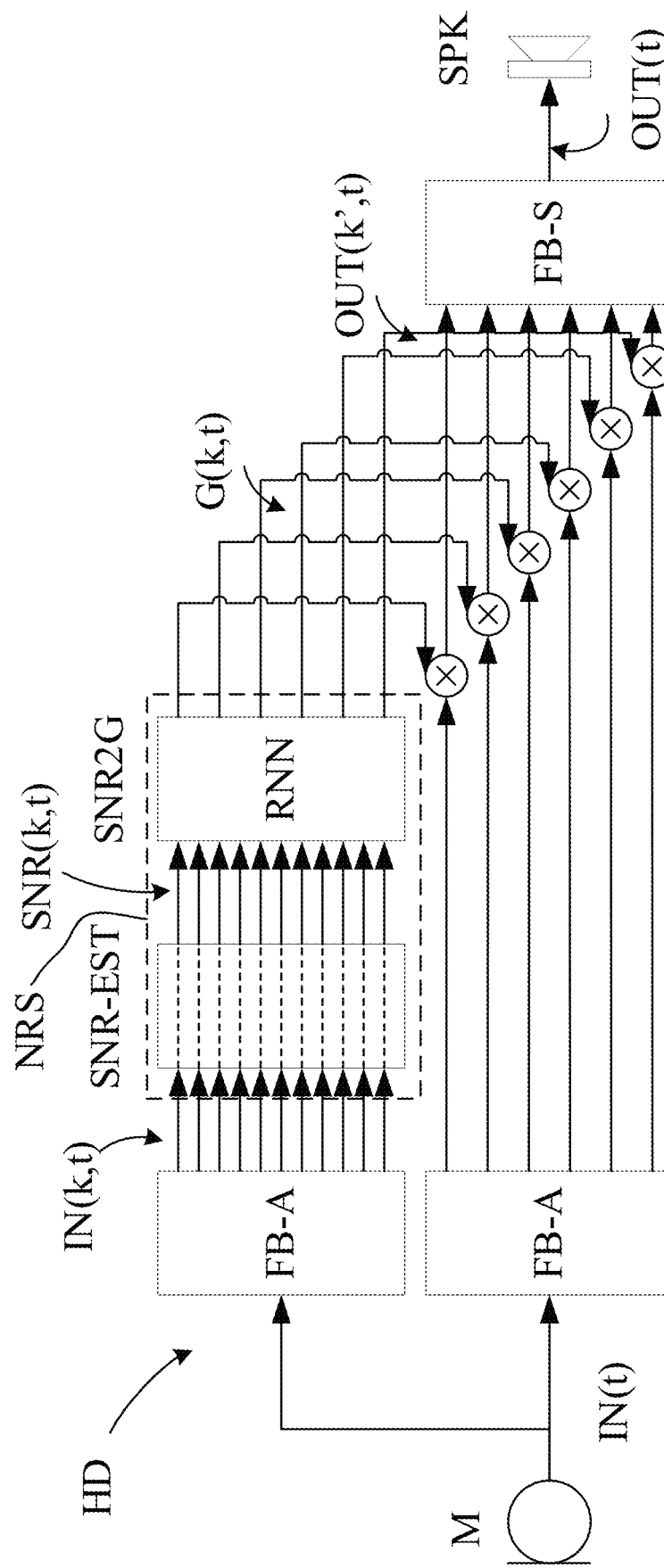

FIG. 4A shows a first embodiment of a hearing aid (or a microphone path of a headset if the loudspeaker is substituted by a transmitter) according to the present disclosure comprising an input part as illustrated in FIG. 3A. The SNR-to-gain estimator (SNR2G) may be implemented as shown in FIG. 2A.

In the present disclosure, a hearing aid or a headset comprising a noise reduction system comprising an SNR to gain conversion block (SNR2G) implemented as a recurrent (possibly deep) neural network (RNN) according, to the present disclosure is described. The hearing aid comprises a forward (audio) signal path comprising at least one input transducer (e.g. a microphone M) providing at least one electric input signal IN(t) representing sound in the environment of the hearing aid or headset. The forward path further comprises an analysis filter bank (FB-A) converting the (time domain) electric input signal IN(t) to a multitude (K) of frequency channels IN(k,t), where k=1, . . . , K, is a frequency index, and t is a time (frame) index. The hearing aid further comprises an analysis path comprising a noise reduction system (NRS, cf. dashed enclosure) configured to reduce noise in the (noisy) electric input signal (IN(k,t), or in a signal derived therefrom) to thereby provide the user with a better quality of a target signal (the target signal being e.g. a speech signal from a communication partner) assumed to be present in the noisy electric input signal. The noise reduction system comprises an SNR estimator (SNR-EST) configured to estimate a signal to noise ratio (SNR(k,t)) for respective frequency channels (k) of the (frequency domain) electric input signal IN(k,t), cf. e.g. FIG. 3A. The analysis path may have its own analysis filter bank (FBA) as shown in embodiment of FIG. 4A. This may e.g. be relevant, if the number of channels (e.g. K) of the analysis path is different (larger or smaller) from the number of channels of the forward (audio) path (e.g. K'). The analysis path may use the same analysis filter bank (FB-A) as the forward path, if the number of channels is the same as in the forward path (K=K'). If the number of channels in the analysis path is smaller than in the forward path, a 'band sum' unit may be introduced between the analysis filter bank (FB-A) of the forward path and the input to the noise reduction system (NRS). The band sum unit may be adapted to merge a number frequency channels of the forward path into a single frequency channel of the analysis path, so that the resulting number of channels K of the analysis path is smaller than the number of channels K' of the forward path.

An example recurrent neural network comprising three layers for implementing the SNR-to-gain estimator (SNR2G, RNN) is shown in FIG. 2A. The three layers are a) a fully connected input layer, b) a hidden GRU layer (e.g. a Peak GRU RNN layer, and c), and a fully connected output layer. The SNR-to-gain block utilizes information across different frequency channels to improve a noise reduction system by letting a gain estimate for the $k^{th}$ frequency channel not only depend on the SNR in the $k^{th}$ channel, but on the SNR estimate of a number of neighbouring, such as on all, frequency channels.

Figure 4B:
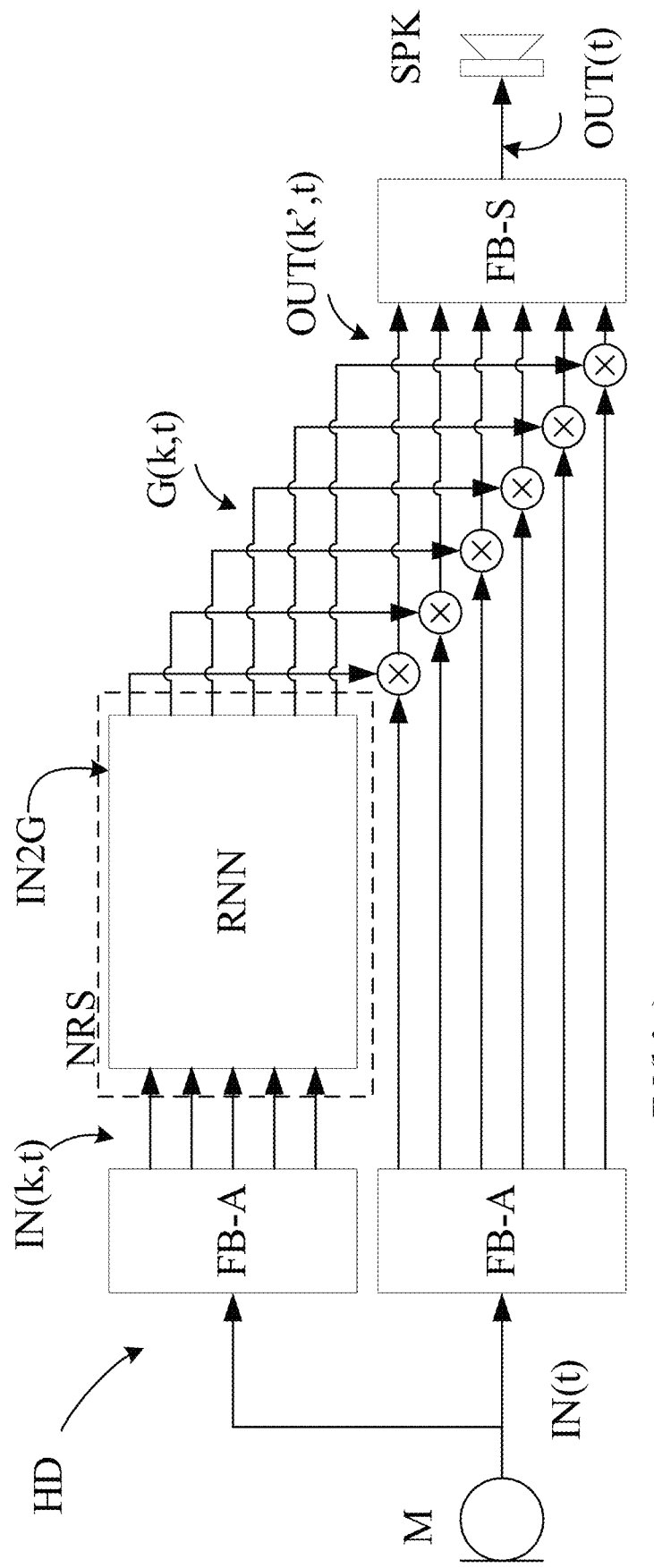

FIG. 4B schematically shows a second embodiment of a hearing aid according to the present disclosure comprising an input part as illustrated in FIG. 3B, where the noise reduction system (NRS) comprises a direct translation of the frequency sub-band signals (IN(k,t)) from the analysis filter bank (FB-A) to a noise reduction gain G(k,t) (typically an attenuation).

The forward path of the embodiments of a hearing device shown in FIGS. 4A and 4B each comprises a number of combination units (here multiplication units 'x') for applying the frequency dependent gains G(k,t) to the input signal IN(k',t) of the forward (audio) path. If the number of frequency channels K of the analysis path providing the frequency dependent gains G(k,t) is different from the number of frequency channels K' of the forward path providing the input signal IN(k',t), a 'band distribution' (or a 'band sum') unit is implicit between the output (G(k,t)) of the noise reduction system (NRS) and the combination units ('x') to adapt the gain signal G(k,t) to the number of frequency channels of the input signal IN(k',t). The output of the combination units ('x') is a resulting noise reduced signal OUT(k',t). The forward path further comprises a synthesis filter bank (FB-S) for converting the frequency sub-band signal OUT(k',t) to a time domain signal OUT(t). The forward path further comprises an output transducer (here a loudspeaker (SPK)) for converting the output signal OUT(t) to stimuli (here an acoustic signal comprising vibrations in air) perceivable as sound by the user. The output transducer may comprise a vibrator to provide bone conducted stimuli or a multi-electrode array of a cochlear implant to provide electric stimuli of the cochlear nerve.

The hearing aid/headset may comprise further circuitry to implement other functionality of a hearing aid/headset, e.g. an audio processor for applying a frequency and level dependent gain to a signal of the forward (audio) path, e.g. to compensate for a hearing impairment of the user. The audio processor may e.g. be located in the forward path, e.g. between the combination units ('x') and the synthesis filter bank (FB-S). The hearing aid may further comprise analogue to digital and digital to analogue converters as appropriate for the application in question. The hearing aid may further comprise antenna and transceiver circuitry allowing the hearing aid or headset to communicate with other devices (e.g. a contra-lateral device, e.g. a contralateral hearing aid or headset part), e.g. to establish a link to a remote communication partner, e.g. via a cellular telephone.

Figure 5A:
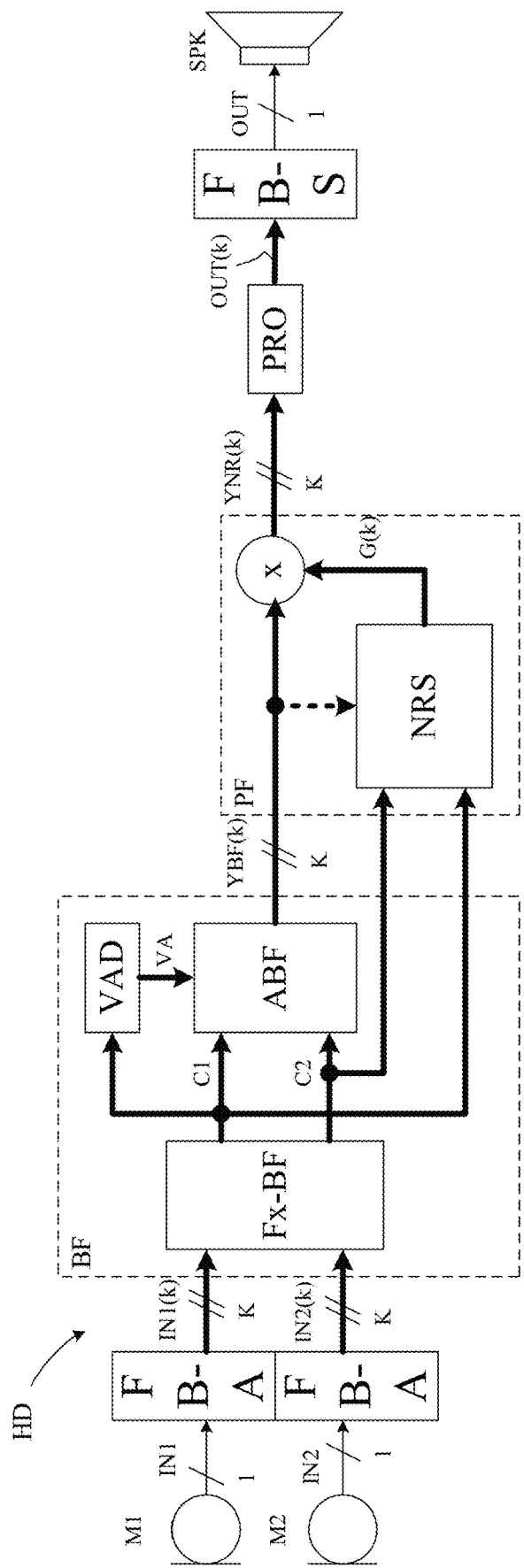

FIG. 5A shows a second embodiment of a hearing aid according to the present disclosure. The embodiment of FIG. 5A is similar to the embodiment of FIG. 4A but comprises an additional input transducer (M1, M2) and a beamformer (BF, cf. dashed enclosure). The hearing aid (HD) comprises two input transducers (microphones (M1, M2)) providing respective (time domain) electric input signals (IN1, IN2). Each of the electric input signals may be subject to analogue to digital conversion before being presented to an analysis filter bank (FB-A), which provide corresponding (time variant) frequency sub-band signals IN1(k) and IN2(k) representative of sound in the environment of the user wearing the hearing aid in K frequency sub-bands as indicated by the bold arrows denoted K (time dependence t is implicit in FIG. 5A). The hearing aid comprises a beamformer (BF) adapted to provide a spatially filtered (beamformed) signal YBF(k) in dependence of the input signals IN1, IN2 (or signals originating therefrom) and (fixed and/or adaptively updated) beamformer weights. The beamformer comprises a fixed beamformer block (Fx-BF) providing a number of fixed beamformers (here two, C1, C2, e.g. a target maintaining and a target cancelling beamformer) in dependence of the input signals IN1, IN2. The beamformer further comprises an adaptive beamformer (ABF) and a voice activity detector (VAD). The voice activity detector is configured to provide a control signal (VA) indicative of whether or not (or with what probability) an input signal (here the signal from fixed beamformer C1, e.g. a target maintaining beamformer) comprises a voice signal (at a given point in time). The adaptive beamformer (ABF) is configured to provide the spatially filtered signal YBF(k) in dependence of the signals from the fixed beamformers C1, C2. The adaptive beamformer (ABF) is e.g. adapted to update its filter weights in dependence of the control signal (VA) from the voice activity detector. An estimate of the noise field around the user may e.g. be determined in absence of voice. The algorithm for adaptively updating filter weights of the adaptive beamformer (ABF) may e.g. be a minimum variance distortionless response (MVDR) algorithm or similar algorithm, e.g. based on a statistical approach and one or more constraints.

The hearing aid further comprises a noise reduction system (NRS) according to the present disclosure, e.g. as described in connection with FIG. 3A. The noise reduction system (NRS) provides postfilter gains G(k) (denoted G(k,t) in FIGS. 3A and 4A) in dependence of the outputs of the fixed beamformers (C1, C2). The signals from the fixed beam formers (e.g. a target maintaining (C1) and a target cancelling (C2) beamformer) may form the basis of estimating a signal to noise ratio (SNR) on a time-frequency basis (k,t). The SNR-estimate may provide the inputs to an SNR-to-gain estimator (SNR2G) as described in connection with FIGS. 2A and 3A. Alternatively, the signals from the fixed beamformers (e.g. a target maintaining (C1) and a target cancelling (C2) beamformer) may be fed directly to a neural network for estimating the appropriate gain (G(k)) as described in connection with FIG. 11B. As indicated in FIG. 5A with dashed arrow, the beamformed signal YBF(k) may also serve as an input to the noise reduction system (e.g. to improve an SNR-estimate). The postfilter gains G(k) are applied to the K frequency sub-bands of the spatially filtered signal YBF(k) in combination unit ('X'), thereby providing noise reduced signal YNR(k). The noise reduction system (NRS) and the combination unit ('X') provides the function of a (single channel) postfilter (PF, see dashed enclosure in FIG. 5A).

Figure 5B:
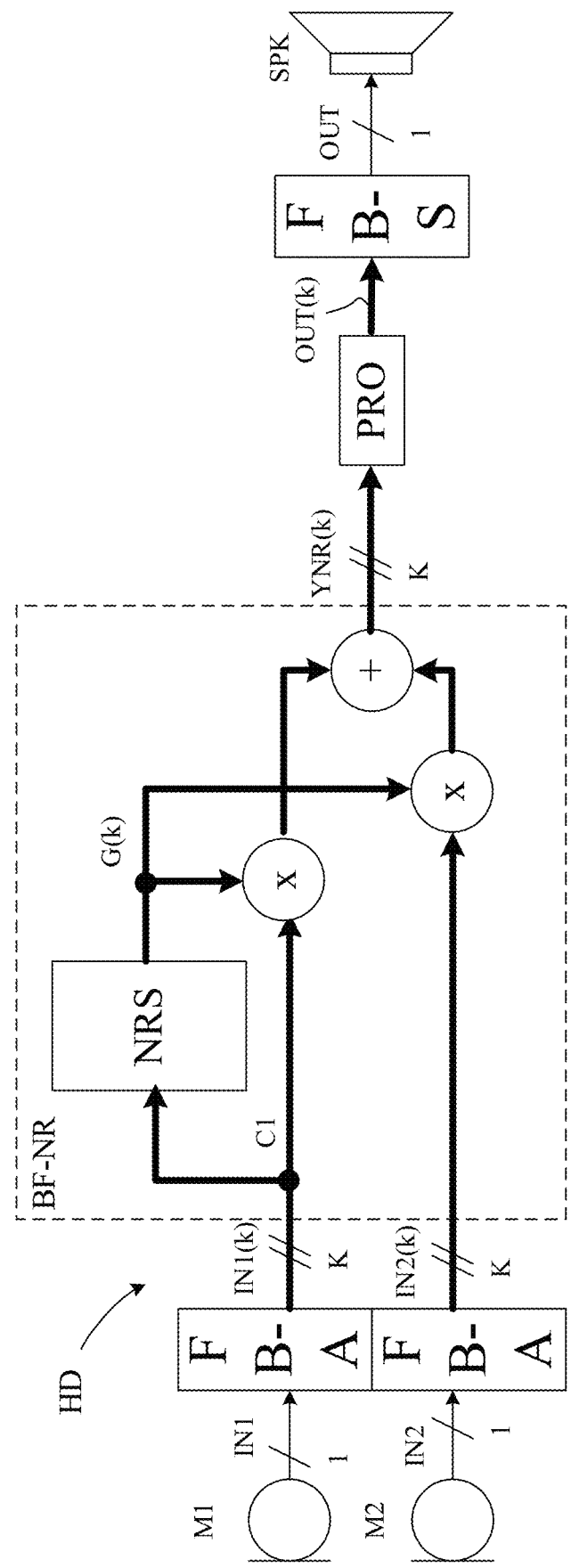

FIG. 5B schematically shows a fourth embodiment of a hearing aid according to the present disclosure, wherein the noise reduction system comprises a combined beamformer and noise reduction system (post filter). In this embodiment, the noise reduction system may be implemented as a recurrent neural network (RNN) as illustrated in FIG. 2B, 3B, taking one of the microphone signals (here M1, e.g. a front microphone of a BTE-part of a hearing aid) as input to the neural network. The resulting gains G(k) are applied to the two frequency sub-band signals IN1(k) and IN2(k). The thus noise reduced electric input signals are summed to a beamformed in combination unit ('+'). The beamformer-noise reduction unit (BF-NR) may comprise fixed or adaptive beamformers to provide the signal $Y_{NR}(k)$ as a spatially filtered (and noise reduced) signal.

As shown in the embodiments of FIGS. 5A and 5B, the hearing aid (HD) may further comprise an audio processor (PRO) for applying further processing algorithms to a signal of the forward (audio) path (e.g. YNR(k)), e.g. a compressive amplification algorithm for compensation for a user's hearing impairment. Likewise, algorithms for handling feedback control, a voice interface, etc. may be applied in the processor (PRO). The processor (PRO) provides the resulting output signal (OUT(k)), which is fed to the synthesis filter bank (FB-S). The synthesis filter bank (FB-S) converts the frequency sub-band output signal (OUT(k)) to a time domain signal OUT, which is fed to the output transducer of the hearing aid (here a loudspeaker). In other embodiments other output transducers may be relevant, e.g. a vibrator or an electrode array for a bone conduction and cochlear implant type hearing aid, respectively, or a wireless transmitter for a headset. In case the embodiment of FIG. 5A, 5B represents a microphone path of a headset, the beamformer is configured to pick up the voice of the user in dependence of the microphone signals and fixed and/or adaptively updated beamformer weights. In such case a further loudspeaker path for presenting sound from a remote communication partner may additionally be provided. This is illustrated in FIG. 6.

Figure 6:
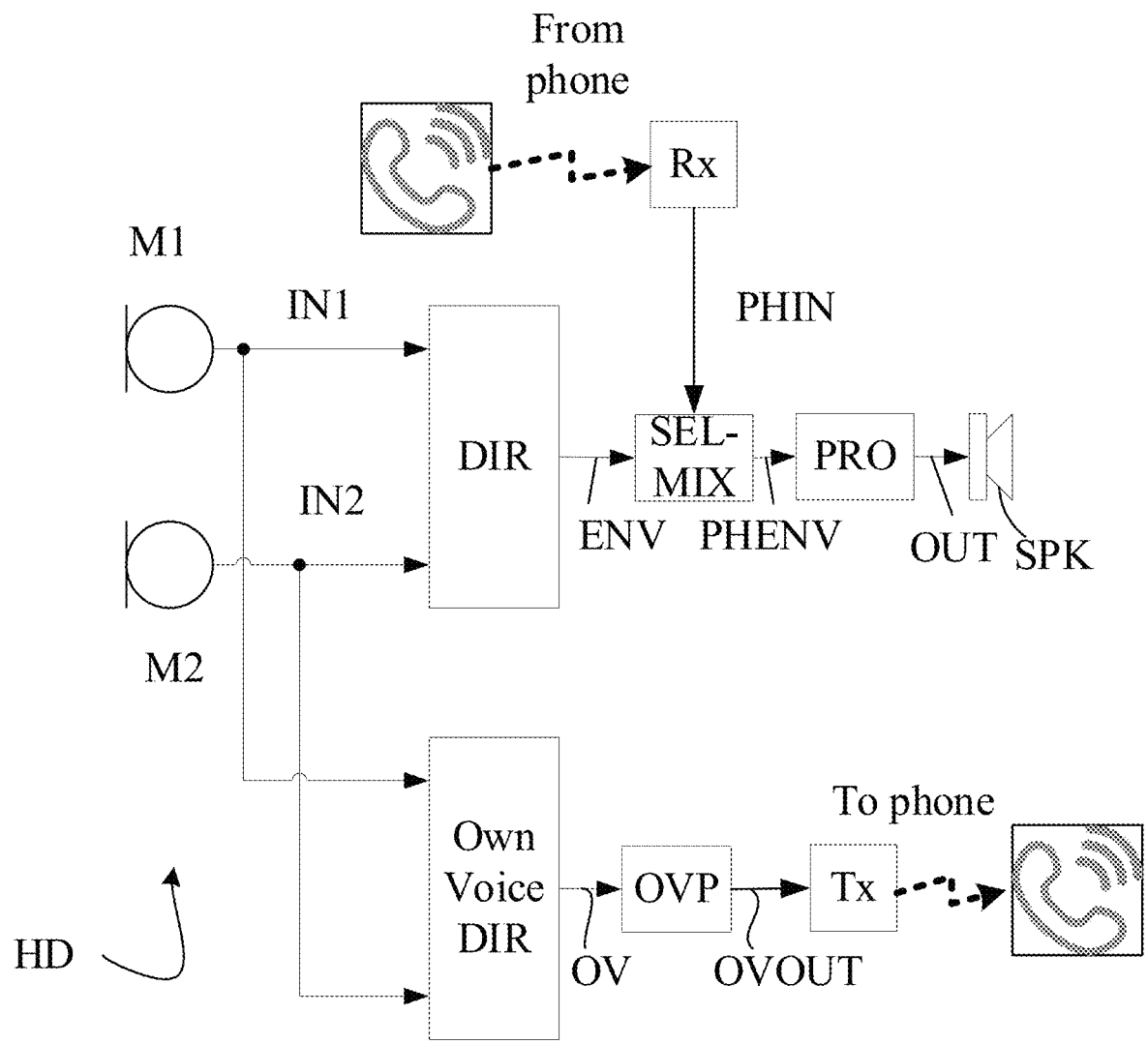
FIG. 6 shows a further embodiment of a hearing aid or a headset according to the present disclosure.

FIG. 6 shows an embodiment of a hearing aid or a headset (HD) according to the present disclosure. FIG. 6 shows an embodiment of a headset or a hearing aid comprising own voice estimation and the option of transmitting the own voice estimate to another device, and to receive sound from another device for presentation to the user via a loudspeaker, e.g. mixed with sound from the environment of the user. FIG. 6 shows an embodiment of a hearing device (HD), e.g. a hearing aid or a headset, comprising two microphones (M1, M2) configured to provide electric input signals IN1, IN2 representing sound in the environment of a user wearing the hearing device. The hearing device further comprises spatial filters DIR and Own Voice DIR, each providing a spatially filtered signal (ENV and OV respectively) based on the electric input signals. The spatial filter DIR may e.g. implement a target maintaining, noise cancelling, beamformer for a target signal in an acoustic far-field relative to the user. The spatial filter Own Voice DIR implements an own voice beamformer directed at the mouth of the user (its activation being e.g. controlled by an own voice presence control signal, and/or a telephone mode control signal). In a specific telephone mode of operation of a hearing aid (or a normal mode of operation of a headset), the user's own voice is picked up by the microphones M1, M2 and spatially filtered by the own voice beamformer of spatial filter 'Own Voice DIR' providing signal OV, which—optionally via own voice processor (OVP)—is fed to transmitter Tx and transmitted (by cable or wireless link to a another device or system (e.g. a telephone, cf. dashed arrow denoted 'To phone' and telephone symbol). In the specific telephone mode of operation of a hearing aid (or in a normal mode of operation of a headset), signal PHIN may be received by (wired or wireless) receiver Rx from another device or system (e.g. a telephone, as indicated by telephone symbol and dashed arrow denoted 'From Phone'). When a far-end talker is active, signal PHIN contains speech from the far-end talker, e.g. transmitted via a telephone line (e.g. fully or partially wirelessly, but typically at least partially cable-borne). The 'far-end' telephone signal PHIN may be selected or mixed with the environment signal ENV from the spatial filter DIR in a combination unit (here selector/mixer SEL-MIX), and the selected or mixed signal PHENV is fed to output transducer SPK (e.g. a loudspeaker or a vibrator of a bone conduction hearing device) for presentation to the user as sound. Optionally, as shown in FIG. 6, the selected or mixed signal PHENV may be feel to processor PRO for applying one or more processing algorithms to the selected or mixed signal PHENV to provide processed signal OUT, which is then fed to the output transducer SPK. The embodiment of FIG. 6 may represent a headset, in which case the received signal PHIN may be selected for presentation to the user without mixing with an environment signal. The embodiment of FIG. 6 may represent a hearing aid, in which case the received signal PHIN may be mixed with an environment signal before presentation to the user (to allow a user to maintain a sensation of the surrounding environment; the same may of course be relevant for a headset application, depending on the use-case). Further, in a hearing aid, the processor (PRO) may be configured to compensate for a hearing impairment of the user of the hearing device (hearing aid).

A noise reduction system (e.g. NRS in FIG. 3A, 3B) according to the present disclosure may be included in the 'own voice path' and/or in the 'loudspeaker path'. In the own voice path, the noise reduction system may be implemented in the 'Own Voice DIR' block or in the own voice processor (OVP). In the loudspeaker path, the noise reduction system may be implemented in the 'DIR' block.

Figure 7:
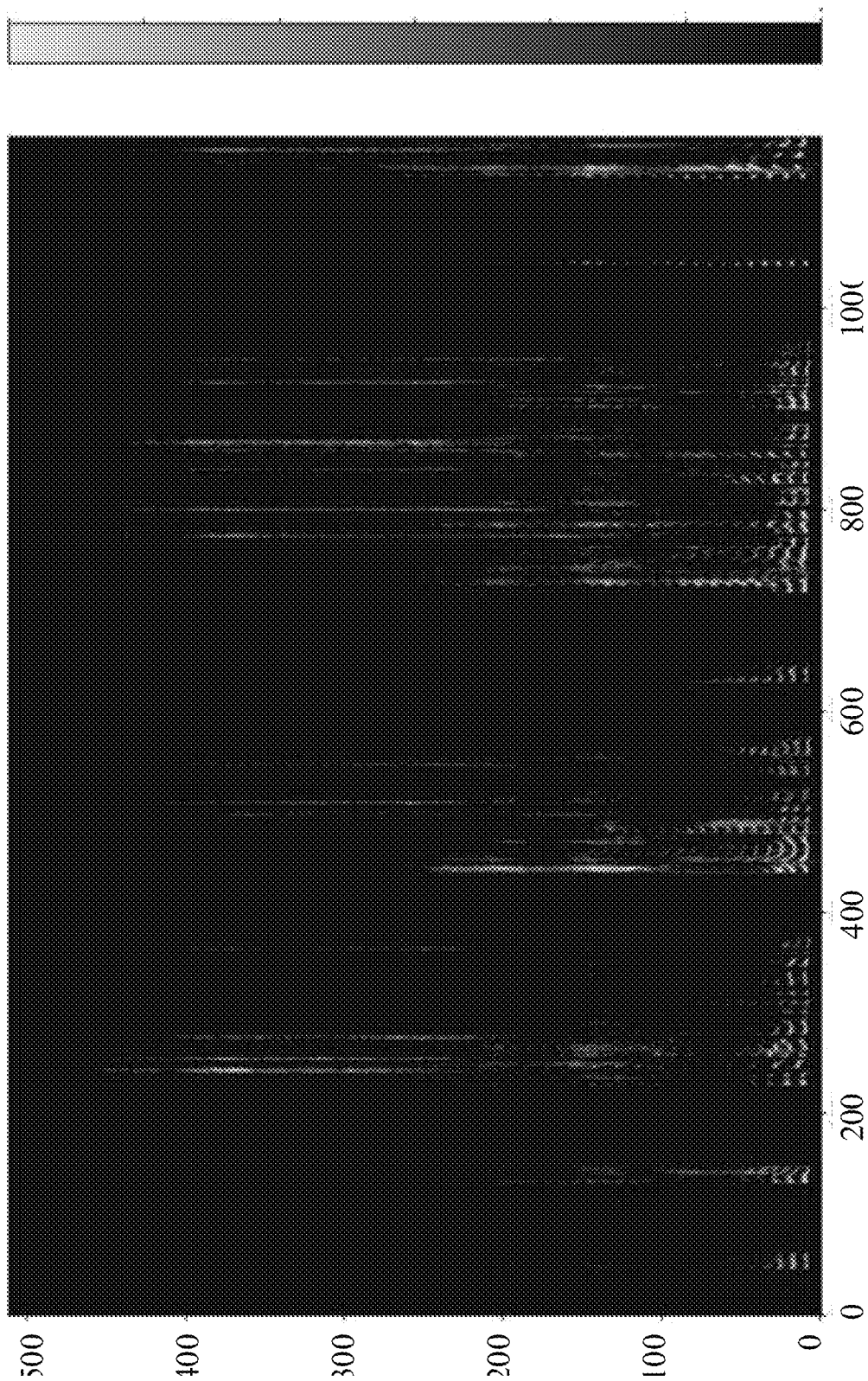
FIG. 7 shows a spectrogram for a speech signal, FIG. 8 schematically illustrates a training setup for a neural network of an SNR-to-gain estimator according to the present disclosure, FIG. 9 schematically illustrates a hardware block for parallel processing of vectorized data, FIG. 10 that shows a zoomed view on a part of the logarithmic histogram for the $|x(t)-\hat{x}(t-1)|$ data from training dataset for the neural network comprising StatsRNN (StatsGRU layer)

FIG. 7 shows a spectrogram showing how a signal varies over time at different frequencies and how it has been attenuated by a neural network according to the present disclosure. More specifically, FIG. 7 shows a spectrogram for a speech signal and the resulting, postfilter gain applied to the signal (the lighter light the less attenuation (speech), the darker the more attenuation (noise). The grey scaling corresponds to attenuation values in decibels from 0 dB (light) to 12 dB (dark). The spectrogram illustrates magnitude values of 512 frequency channels representing a frequency range from 0 to 10 kHz of a speech signal versus time for 1200 time-frames of the signal. As is apparent from FIG. 7, 'speech is sparse' in a spectrogram representation. e.g. <20% of TF-tiles contain target speech. Therefore, it lends itself to the present scheme where TF-tiles without changes may be ignored in the update of the neural network. The same would be apparent from video images.

Training

Figure 8:
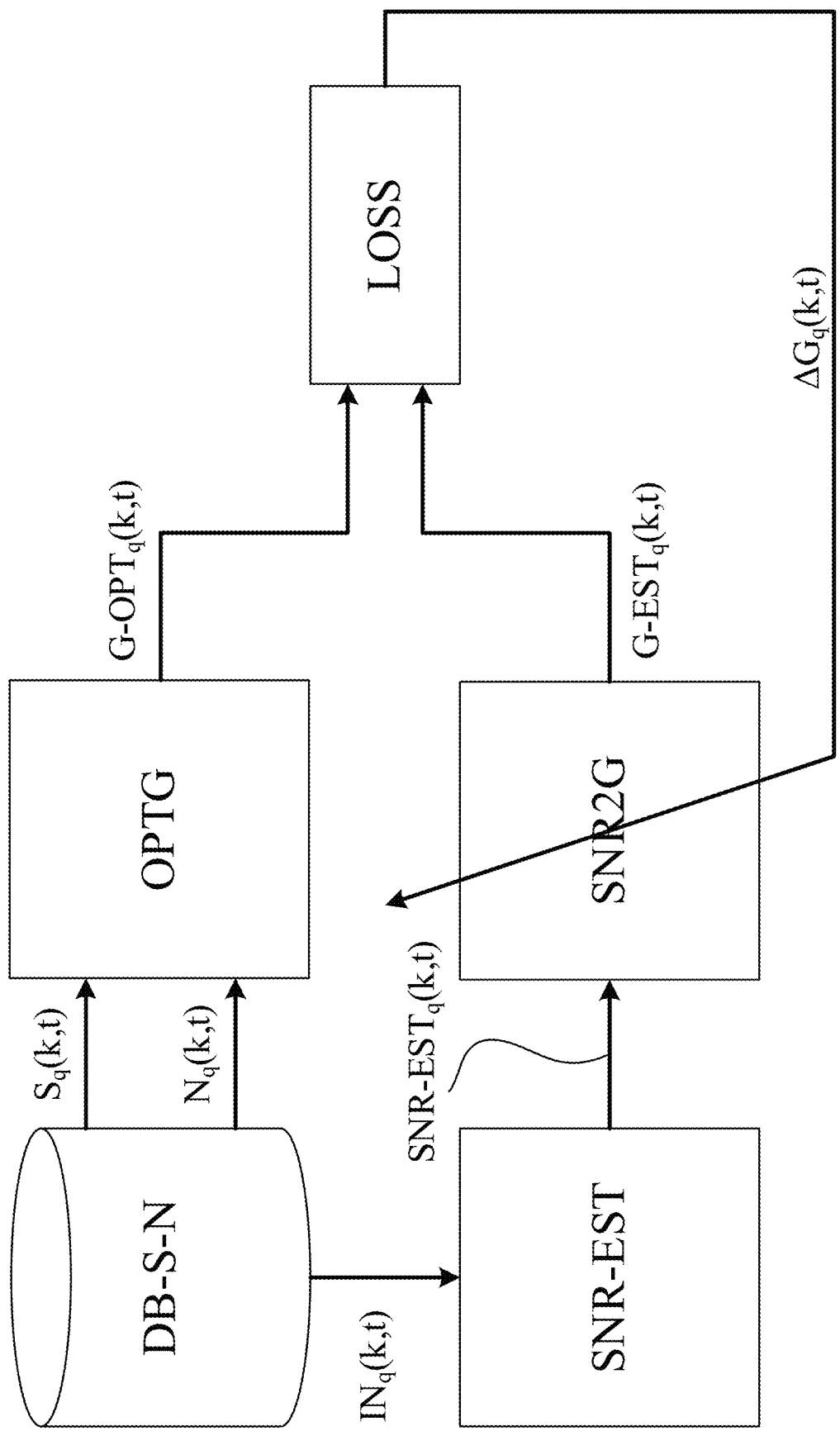

FIG. 8 schematically illustrates a training setup for a neural network of an SNR-to-gain estimator according to the present disclosure. The drawing and some of the following, description is taken from EP3694229A1.

Figure 1C:
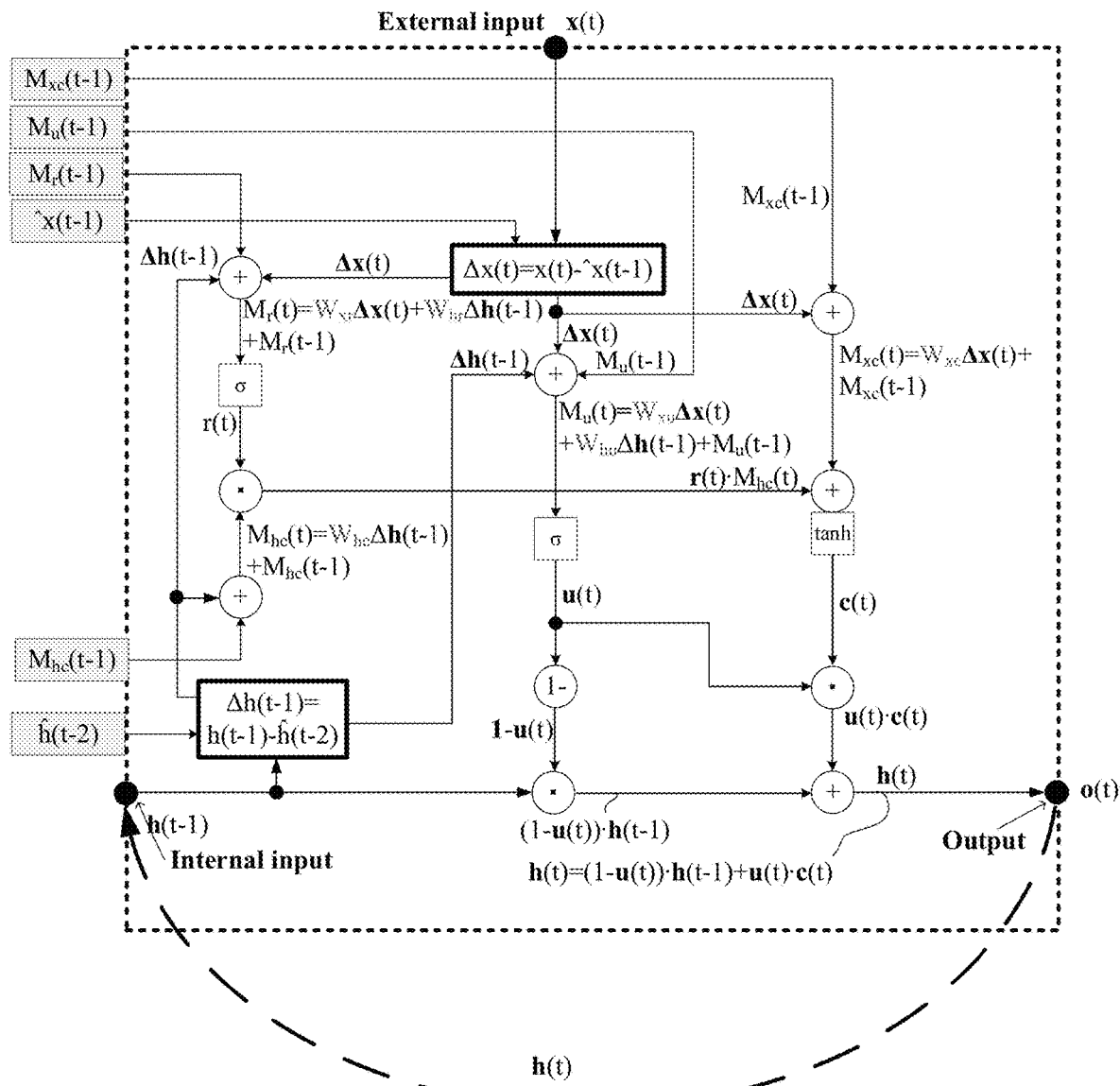
FIG. 1C shows a graphical illustration of the computations required for implementing a delta GRU layer, FIG. 2A schematically illustrates an exemplary neural network for converting a signal-to-noise-ratio to a gain (cf. SNR2G block in FIG. 3A) for attenuating noise, the neural network comprising a gated recurrent unit (GRU) layer.

In general, a neural network comprising the Peak GRU RNN algorithm according to the present disclosure may be trained with a baseline GRU RNN providing optimal weights for a trained network (e.g. weight matrices ($W_{xr}$, $W_{hr}$, $W_{xc}$, $W_{hc}$, $W_{xu}$, $W_{hu}$, cf. FIG. 1A, 1C). The Peak GRU constraints may then be applied to the trained network.

The neural network may be trained on examples of estimated signal-to-noise ratios as input obtained from a noisy input mixture and its corresponding output as a vector across frequency of a noise-reduced input signal mainly containing the desired signal. The neural network may be trained on examples of (digitized) electric input signals IN(k,t), e.g. directly from an analysis filter bank (cf. e.g. FB-A in FIG. 3A, 3B), for which corresponding SNR's and/or appropriate gains are known (or for which appropriate gains are known, if the SNR-estimator form part of the neural network).

The neural network (RNN) may be trained on examples of estimated signal-to-noise ratios as input obtained from a noisy input mixture and its corresponding output as a vector across frequency of a noise-reduction gains (attenuation), which, when applied to (a digital representation of) the electric input signal, provides a signal mainly containing the desired (target) signal. The Peak GRU RNN may be trained using a regular GRU, i.e. the trained weights and biases are transferred from GRU to Peak GRU.

As discussed in EP3694229A1, the SNR-to-gain converter (cf. e.g. SNR2G in the drawings) may comprise the neural network, wherein the weights of the neural network have been trained with a plurality of training signals (cf. e.g. FIG. 8). The SNR estimator (SNR-EST) providing inputs to the SNR-to-gain converter (SNR2G) may be implemented by conventional methods, e.g. NOT be implemented using, an artificial neural network or other algorithms based on supervised or unsupervised learning. It may also be implemented using a neural network.

FIG. 8 schematically illustrates a training setup for a neural network of an SNR-to-gain estimator (SNR2G) according to the present disclosure. FIG. 8 shows a database (DB-S-N) comprising appropriate examples (index q, q=1, . . . , Q) of time segments of clean speech S, each time segment being e.g. larger than 1 s, e.g. in the range from 1 s to 20 s. The database may comprises each time segment in a time-frequency representation S(k,t), where k is the frequency index and t is the time index. The database may comprise corresponding examples of noise N (e.g. different types of noise and/or different amounts (level) of noise) for the $p^{th}$ speech segment), e.g. in a time-frequency representation N(k,t). A given mixture of clean speech S and noise N is associated with a (hence) known SNR, and a known intended corresponding optimal gain G-OPT. These data may be taken as 'ground truth' data for training the algorithm and providing optimized weights of the neural network. The different corresponding time segments of clean speech $S_q(k,t)$ and noise $N_q(k,t)$ may be presented separately (in parallel) to the block (OPTG) for providing, an optimal gain G-$OPT_q(k,t)$ for the given combination $S_q(k,t)$, $N_q(k,t)$ of speech and noise. Likewise, the different corresponding time segments of clean speech $S_q(k,t)$ and noise $N_q(k,t)$ may be mixed and the mixed signal $IN_q(k,t)$ may be presented to the SNR-estimator (SNR-EST) for providing an estimated SNR (SNR-$EST_q(k,t)$) for the noisy (mixed) input signal $IN_q(k,t)$ for the given combination $S_q(k,t)$, $N_q(k,t)$ of speech and noise. The estimated SNR (SNR-$EST_q$k,t)) is fed to SNR-to-gain estimator (SNR2G) implemented as a neural network, e.g. a recurrent neural network according to the present disclosure, which provides a corresponding estimated gain G-$EST_p(k,t)$. The respective optimal and estimated gains (G-$OPT_q$k,t), G-$EST_q(k,t)$) are fed to a cost function block (LOSS), which provides a measure of the current 'cost' ('error estimate'). This 'cost' or 'error estimate' is iteratively fed back to the neural network block (SNR2G) to modify the neural network parameters until an acceptable error estimate is achieved. Instead of relying on a separate SNR estimator (as e.g. shown in FIG. 3A, 4A, 5A), the neural network may be configured to provide a noise reduction gain G(k,t) directly from a noisy input signal (IN(k,t), see e.g. FIG. 3B, 4B, 5B). In that case, the adaptive training procedure of FIG. 8 should include the SNR-EST as one neural network.

The training data may be delivered to the neural network on a time-frame by time frame basis (SNR(k,t) followed by SNR(k,t+), or IN(k,t) followed by IN(k,t+1)), where one time step represents a frame length (e.g. $N_s$ (e.g. $N_s$=64) samples/frame divided by the sampling frequency $f_s$ (e.g. $f_s$=20 kHz) providing an exemplary frame length of 3.2 ms) or a fraction thereof (in case of overlap between neighbouring time frames). Likewise the output of the neural network G(k,t) may be delivered on a time-frame by time frame basis (G(k,t) followed by G(k,t+1)).

The neural network may be randomly initialized and may thereafter be updated iteratively. The optimized neural network parameters (e.g. a weights, and a bias-value) for each node may found using standard, iterative stochastic gradient, e.g. steepest-descent or steepest-ascent methods, e.g. implemented using back-propagation minimizing a cost function, e.g. the mean-squared error, (cf. signal $\Delta G_q(k, t)$) in dependence of the neural network output G-$EST_p$(k,t) and the optimal gain G-$OPT_q$(k,t). The cost function (e.g. the mean-squared error) is computed across many training pairs (q=1, . . . , Q, where Q may be ≥10, e.g. ≥50, e.g. ≥100 or more) of the input signals.

The optimized neural network parameters may be stored in the SNR-to-gain estimator (SNR2G) implemented in the hearing device and used to determine frequency dependent gain from frequency dependent input SNR-values, e.g. from an 'a posteriori SNR' (simple SNR, e.g. (S+N)/<N>), or from an 'a priori SNR' (improved SNR, e.g. <S>/<N>), or from both (where <•> denotes estimate).

It may be advantageous that the thresholds for selecting the neurons to be processed are different across the neurons (within a given layer). The threshold for a given neuron maybe adapted during training.

Thresholds may also be different between layers, if more than one RNN-layer is present.

Other training methods may be used, see e.g. [Sun et al.; 2017]. See also section 'Statistical RNN (StatsRNN)' below.

The neural network preferably have an input vector and an output vector with a dimension of K (as a time frame of the input signal IN(k,t) (or SNR(k,t)) and a corresponding (estimated) noise reduction gain G(k,t)), where K is the number of frequency bands of the analysis path of the hearing device, wherein the neural network is implemented (see e.g. FIG. 4A, 4B, 5A, 5B), K may be equal to or different from the number of frequency bands of the forward (audio) path of the hearing device.

Figure 9:
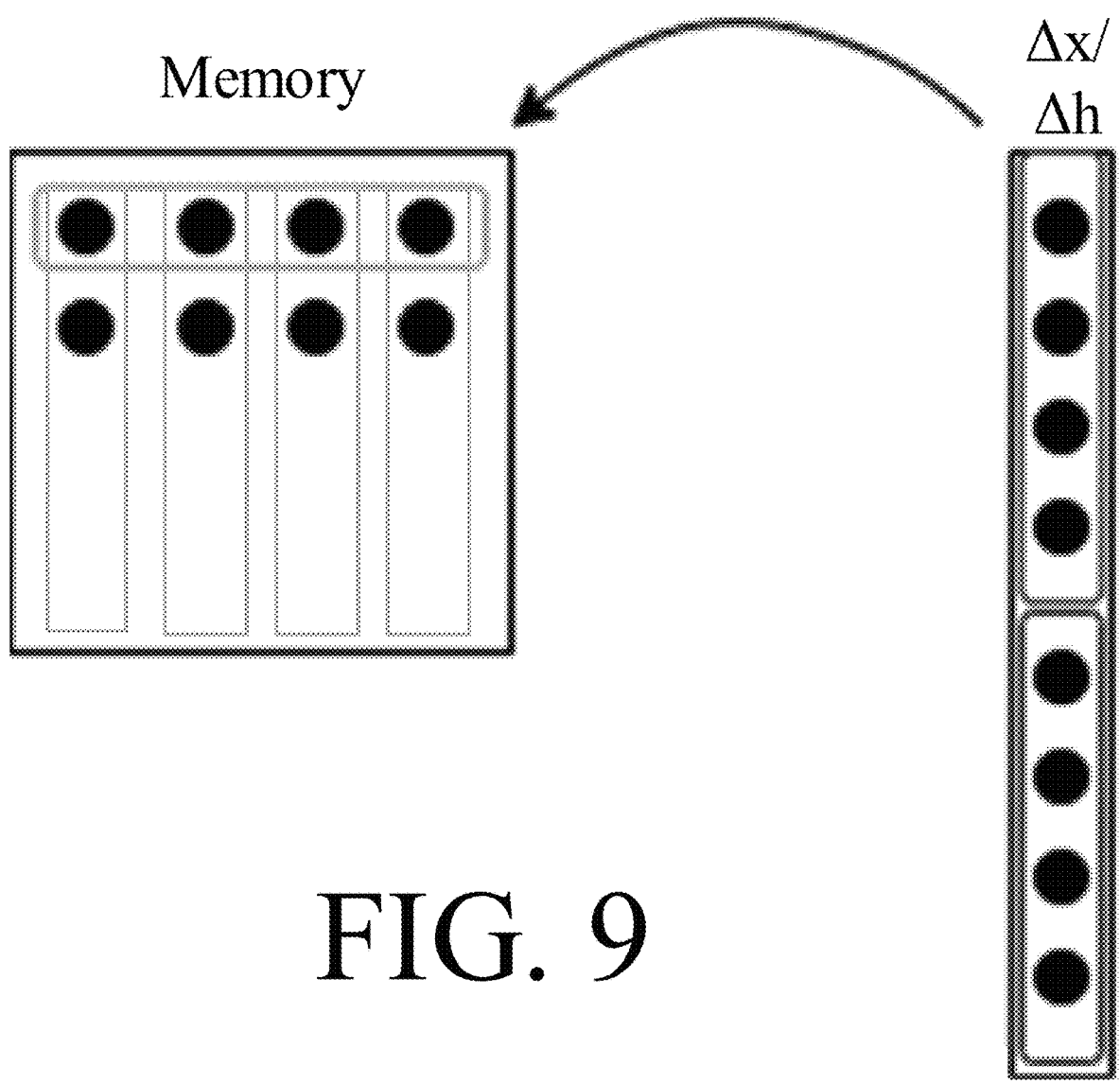

FIG. 9 schematically illustrates a hardware block configured to operate on a set of values (a vector) at one time, here exemplified in groups of four elements. In hardware, computations are often done in groups (vectors), where in case of Peak GRU RNN and Delta GRU RNN either nothing or an entire vector would be processed. Therefore, a hardware block adapted to the Peak GRU RNN algorithm may e.g. be adapted to calculate an average per group, and to choose the biggest vector groups based on such average.

Furthermore, the elements may be reorganized such that the adjacent frequency bands are spread across different groups (in order not to lose the fundamental information from lower bands if the entire vector groups are discarded). The 4 vertical rectangles in the memory (denoted 'Memory' in FIG. 9) is intended to illustrate that the entire vector/rectangle (e.g. a column of a weight matrix) corresponds to an input in the $\Delta x/\Delta h$-vector (denoted '$\Delta x/\Delta h$' in FIG. 9). Therefore, if the 4 elements in the $\Delta x$- or $\Delta h$-vector will be skipped (they are zero), those 4 weight columns will be skipped too. This is to visualize that the entire weight columns are skipped, not just one element in the horizontal rectangle of the Memory in FIG. 9.

Several ways are possible when processing elements in hardware. We can either process the elements sequentially one by one, or we can do vectorized operations (operating on a set of values (vector) at one time, providing speed up) in, e.g. groups of four elements. In this case, we would need to decide whether we want to process or discard all four elements since they would be received and output in vectors. This could be based on determining whether most/some number of the values are above a threshold/among the top Np values in a vector. If this is the case, the entire vector will be processed. If not, all values will be discarded. It is then important to consider how the individual frequency bands would be grouped in vectors. Grouping the frequency bands in the original order (band 1, 2, 3, 4, etc.) could result in losing, e.g. lower frequency information if most values withing the vector would be too small. Therefore, regrouping could be considered (e.g. based on experiments).

Combination of Peak GRU and Delta GRU

Furthermore, the Peak GRU RNN and Delta GRU RNN approaches may be combined, i.e. we can firstly determine whether the values are above a specific delta threshold, and then additional filtering based on Peak GRU RNN could be applied (or vice versa). This combines the advantage of both approaches, i.e. to only update while exceeding a threshold, but not to update more than $N_p$ neurons.

A combination of the Peak GRU RNN and Delta GRU RNN may comprise the option that, if $N_p$ is not reached in one layer (based on a Delta GRU threshold), the 'saved' calculations may be moved to another layer (or time step), where $N_p$ has been exceeded (presuming the neural network having more than one Peak GRU layer).

Statistical RNN (StatsRNN) (Training, and Setting of Peak and/or Thresholds Values, $N_p$, $\Theta$)

Figure 10:
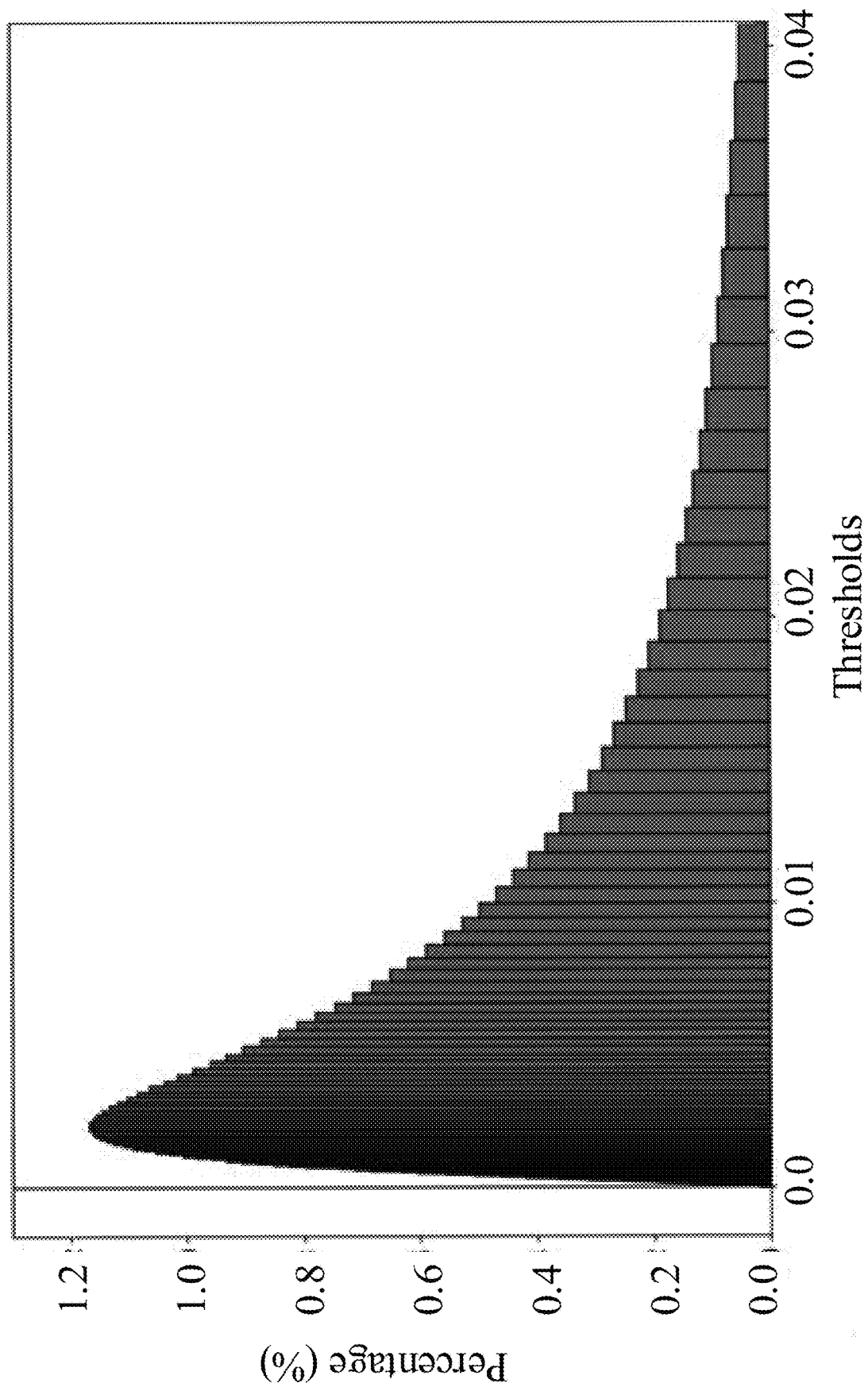

Another way to obtain/approximate top elements like Peak GRU RNN is to look at the data from a statistical perspective to investigate if the $|x(t)-\hat{x}(t-2)|$ and $|h(t-1) h(t-2)|$ computations, determining whether the elements should be zeroed out, have any underlying statistical property that could be exploited. We can create a histogram for x and h computations (across all the acoustic environments or each environment individually) above (absolute values of subtractions) separately based on the training dataset and explore whether the data has random behavior or not (this is illustrated with an example in FIG. 10 that shows a zoomed view on a part of the logarithmic histogram for the $|x(t)-\hat{x}(t-1)|$ data from training dataset for the neural network comprising StatsRNN (StatsGRU layer). The thin black vertical line to the very left corresponds to the first bin that contains ~31% of zeros in this case, X (horizontal) and y (vertical) axes correspond to the threshold values—histogram bar boundaries—and percentages, respectively, i.e. how many elements of the total training dataset are within each of the bars). If data are not random as in the example of FIG. 10, the threshold can then be statistically determined (using histogram bins) for x and h separately, corresponding to the percentage of top elements that should be processed. This approach preserves the idea of Peak GRU RNN and provides a valuable insight into a given dataset. The StatsRNN analytically defines a starting threshold for x and h individually. This is a very important consideration since the vectors have different sparsity as also shown in [Neil et al.: 2018], and their individual handling might contribute to additional improvements. Therefore, exploiting a priori knowledge about the data will lead to a better and more deterministic algorithm with consistent performance as well as better determination of the necessary data word length for hardware execution.

Furthermore, we can apply adaptive thresholding, i.e. the thresholds for x and h are not static and can be adjusted e.g. from one time step to another (either across all the environments or each environment individually). If too many elements are being processed in the current timestep t with the current thresholds (too many elements of the vector are above the threshold than necessary. e.g. 80 instead of 50 out of 100), the threshold can be increased in the next time step. The new threshold value may be determined based on histogram again, i.e. we may take the boundary of the adjacent histogram bar to the right (bigger value) of the current boundary or any other boundary of the histogram that is greater than the current one. Regarding the elements themselves, we can either proceed with doing further computations with all of them or perform additional filtering to obtain a desired (or a close to) number of elements (50 out of 100, dropping 30 elements from initial 80). This filtering may be done based on sorting and selecting the biggest values, selecting the first/last elements that were above the threshold, selecting random elements that were above the threshold etc. Alternatively, the elements which are above the threshold, but not selected, may be prioritized in the next time step.

Likewise, if too few elements are being, processed in the current timestep t (e.g. 20 instead of 50 out of 100), the threshold can be lowered in the next time step and may be determined based on histogram. We can take the boundary of the adjacent histogram bar to the left (smaller value) of the current boundary or any other boundary of the histogram that is smaller than the current one. Regarding the elements themselves, we may either proceed with doing further computations with the few obtained elements or perform additional selection of elements to obtain a desired (or a close to) number of elements (in this example, additional 30 elements to obtain 50 out of 100). This selection may be done based on sorting and selecting the biggest values, setting a higher threshold already in the current time step and select e.g. the first/last/random elements that are above the threshold etc. from the sets of elements that were initially discarded using the original thresholds.

The starting threshold itself may be (is ideally) based on the histogram (could be random as well), which will provide the best starting point and more predictable way of nudging the thresholds. The same x and h thresholds can be used for all acoustic environments or different x and h thresholds can be applied to each environment individually. This method may be used primarily for StatsRNN but also DeltaRNN (and modified versions thereof) in both software and hardware implementation.

Figure 11A:
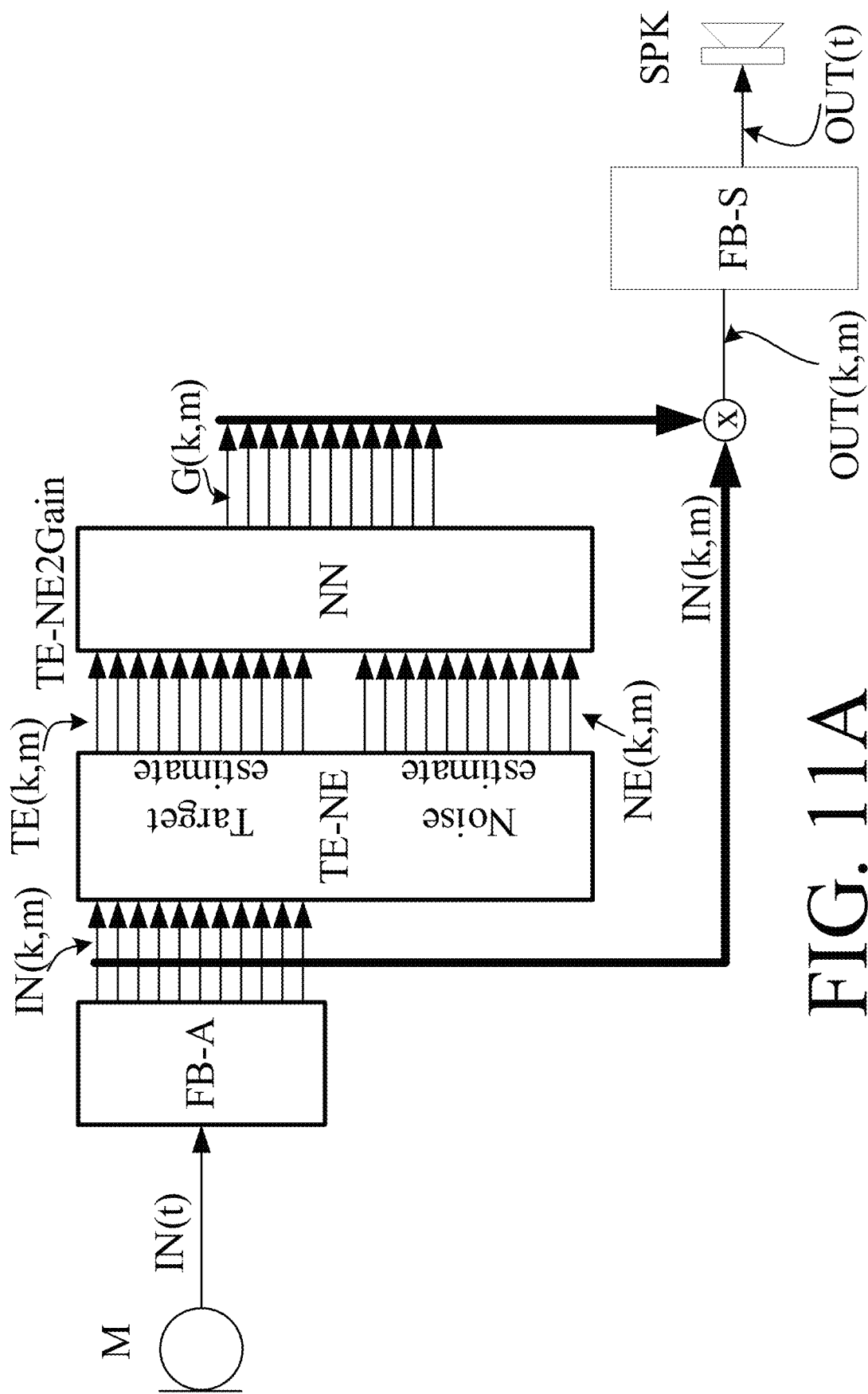
FIG. 11A shows an embodiment of a hearing device according to the present disclosure wherein the input to the neural network comprises separate target and noise estimates or the corresponding magnitude responses of target and noise estimates, or at least a noise estimate or a noise estimate and the noisy input mixture.
Figure 11B:
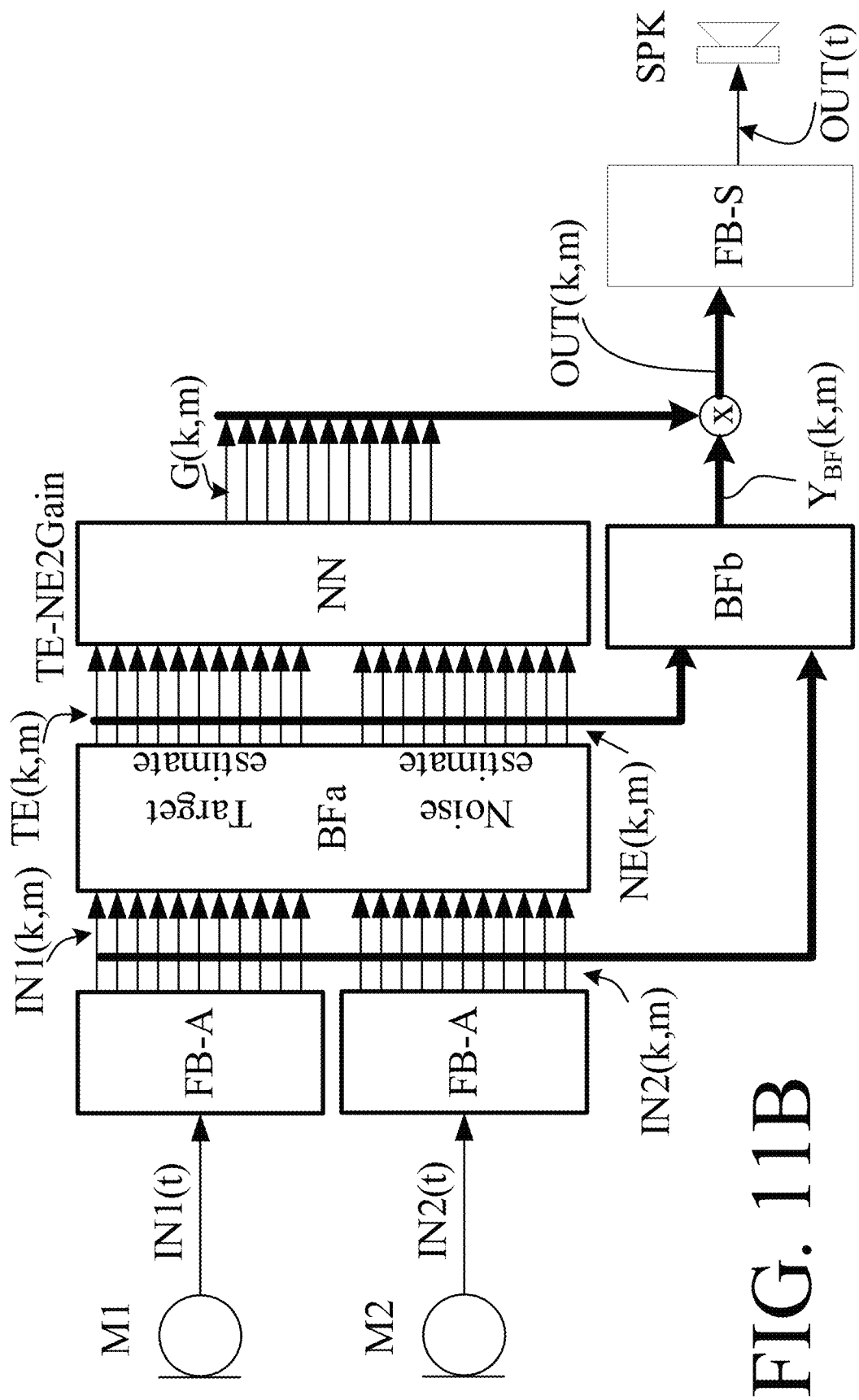
FIG. 11B shows an embodiment of a hearing device according to the present disclosure wherein the input to the neural network comprises the outputs of a target maintaining beamformer (representing a target estimate), and a target cancelling beamformer (representing a noise estimate).

FIGS. 11A and 11B each show different exemplary embodiments of a hearing device, e.g. a hearing aid, wherein the gain estimator (TE-NE2Gain) is implemented by a neural network (NN), e.g. a recurrent or a convolutional neural network, e.g. a deep neural network, preferably comprising a modified gated recurrent unit according to the present disclosure.

FIG. 11A shows an embodiment of a hearing device according to the present disclosure wherein the input to the neural network (NN), implementing a noise reduction gain estimator (TE-NE2Gain), instead of being an SNR (as e.g. in FIG. 2A, 3A, 4A), or instead of being the electric input signal(s) from the input transducers(s) (as in FIG. 2B, 3B, 4B), comprises separate target (TE) and noise (NE) estimates, or the corresponding magnitude responses of target and noise estimates, or at least a noise estimate or a noise estimate and the noisy input mixture. In the embodiment of FIG. 11A, the target estimate (TE) and noise estimate (NE) are estimates based on the signal (IN(t)) from a single input microphone (M). The microphone (M) provides an electric input signal (IN(t), t representing time) in the time domain (e.g. digitized by an analogue to digital converter, as appropriate). The hearing device comprises a filter bank (comprising an analysis filter bank (FR-A) and a synthesis filter bank (FBS)) allowing processing in the hearing device to be conducted in the time-frequency domain (k,m), where k and m are frequency and time indices, respectively. The analysis filter bank (FR-A) is connected to the microphone (M) and provides the electric input signal IN(t) in a time-frequency representation IN(k,m). The hearing device comprises an output transducer, here a loudspeaker (SPK), for converting an output signal (OUT(t)) in the time-domain to stimuli perceivable by the user as sound. The synthesis filter bank (FB-S)) converts a processed signal in the time-frequency domain (OUT(k,m)) to the output signal (OUT(t)) in the time-domain. The hearing device comprises a target and noise estimator (TE-NE) for providing respective estimates of target (TE(k,m)) and noise (NE(k,m)) components of the electric input signal (IN (k,m)). The target (TE(k,m)) and noise (NE(k,m)) estimates are inputs to the gain estimator (TE-NE2Gain), implemented by a neural network (NN), e.g. a recurrent or a convolutional neural network, e.g. a deep neural network, preferably comprising a modified gated recurrent unit according to the present disclosure. The output of the neural network (NN) are gain values (G(k,m)) representative of attenuations for implementing noise reduction when applied to a signal of the forward path, here to the electric input signal (IN(k,m)). The gains (G(k,m)) are applied to the electric input signal (IN(k,m)) in a combination unit (here a multiplication unit (N)). The output of the combination unit (X) is the processed output signal (OUT (k,m)), which is fed to the synthesis filter bank (FB-S) for conversion to the time-domain and presentation to the user (and/or transmission to another device or system, e.g. for further processing).

The estimated gain may be applied to the target estimate (TE(k,m)) instead of to the output of the analysis filter bank (electric input signal, IN(k,m)). This is especially relevant in the case where the target estimate is a beamformed signal. Instead of applying the 'noise reduction gains (G(k,m)) from the neural network (NN) to the electric input signal (IN(k, m)), it may be applied to a further processed version of the electric input signal, as e.g. described in the following (see FIG. 11B).

In the case of multiple microphones (cf. e.g. M1, M2 in FIG. 11B), target (TE) and noise (NE) estimates may be obtained from a beamformer filter (BFa) providing linear combinations of the microphone signals (IN1, IN2), e.g. in terms of a target-enhancing beamformer and a target cancelling beamformer (the latter having a null direction pointing approximately towards the target). FIG. 11B shows an embodiment of a hearing device according to the present disclosure wherein the input to the neural network (NN) are the outputs (TE(k,m), NE(k,m)) of a target maintaining beamformer (representing a target estimate, TE(k,m)), and a target cancelling beamformer (representing a noise estimate, NE(k,m)).

The hearing device of FIG. 11B comprises two microphones (M1, M2) each providing an electric input signal (IN1(t), IN2(t)) in the time domain. The hearing device comprises two analysis filter banks (FB-A) connected to respective microphones for providing the electric input signals (IN1(t), IN2(t)) in a time-frequency representation (IN1(k,m), IN2(k,m)). The electric input signals (IN1(k,m), IN2(k,m)) are fed to a beamformer filter (BFa) comprising respective target maintaining and target cancelling beamformers. The target maintaining and target cancelling beamformers provides the target estimate (TE) and the noise estimate (NE) respectively. s in the embodiment of FIG. 11A, the target estimate (TE) and the noise estimate (NE) are used as inputs to the neural network (NN) implementing the noise reduction gain estimator (TE-NE2Gain). The noise reduction gain estimator (TE-NE2Gain) provides gain values (G(k,m)) representative of attenuations for implementing noise reduction when applied to a signal of the forward path, here to a beamformed signal ($Y_{BF}$(k,m)). The beamformed signal ($Y_{BF}$(k,m)) is provided by the beamformer filter (BFb), e.g. as TE-βNE, where β is an adaptively determined parameter (determined in block BFb, cf. e.g. US2017317206A1. The beamformed signal is determined in dependence of the target maintaining and target cancelling beamformers, and the current electric input signals (IN1(k,m), IN2(k,m)) (and possibly a voice activity detector for differentiating between speech and noise).

The beamformers may be fixed or adaptive. Multiple target cancelling beamformers may be used as input features to the neural network (NN) simultaneously. E.g. two target cancelling beamformers, each having a single null direction, but having nulls pointing towards different possible targets.

The magnitudes, or the squared magnitudes, or the logarithm of the magnitudes of the target and the noise estimates may be, used as input to the neural network (NN). The outputs of the neural network (NN) may comprise real or complex valued gains, or separate real valued gains and real valued phases.

The maximum amount of noise reduction provided by the neural network may be controlled by level, or modulation (e.g. SNR), or a degree of sparsity of the inputs to the neural network. A degree of sparsity may e.g. be represented by a degree of overlap in time and/or frequency of background noise with (target) speech.

In the embodiment of FIG. 11B, a noise estimate based on a single target cancelling beamformer is shown. Several noise estimates may, however, be provided as input features to the neural network. The different noise estimates may consist of or be provided by different target cancelling beamformers, each having a null pointing towards a specific direction. But a noise estimate (used as input to the neural network) may also be based on other properties than spatial properties, such as a noise floor estimator, e.g. based on the modulation of the input signal.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The Peak GRU RNN algorithm is exemplified in the field of audio processing, in particular in a noise reduction system framework of a hearing aid or headset. The algorithm can, however, be applied to other tasks, in a hearing aid or headset, or in other audio processing devices, e.g. for direction of arrival estimation, feedback path estimation, (own) voice activity detection, keyword detection, or other (e.g. acoustic) scene classification. But the algorithm may also be applied to other fields than audio processing, e.g. the processing of images or other data comprising a certain amount of redundancy (e.g. relatively slow variance over time, e.g. relative to a sampling time ($t_S=1/f_S$, where $f_S$ is the sampling frequency of such data)), e.g. to processing of financial data, weather data, etc.

REFERENCES

[Neil et al.; 2018] Daniel Neil, Jun Haeng Lee, Tobi Delbruck, Shih-Chii Liu, DeltaRNN: *A Power-efficient Recurrent Neural Network Accelerator*, published in FPGA '18: Proceedings of the 2018 ACM/SIGDA International Symposium on Field-Programmable Gate Arrays, February 2018, Pages 21-30, https://doi.org/10.1145/3174243.3174261

EP3694229A1 (Oticon) 12.08.2020

[Kostadinov; 2018] https://towardsdatascience.com/understanding-gru-networks-2ef37df6c9be

The invention claimed is:

1. A hearing device configured to be worn by a user, the hearing device comprising an input unit for providing at least one electric input signal in a time-frequency representation k, t, where k and t are frequency and time indices, respectively, and k represents a frequency channel, k=1, ..., K, K>1, the at least one electric input signal being representative of sound and comprising target signal components and noise components,
a signal processor connected to the input unit and configured to receive the at least one electric input signal or a signal originating therefrom, the signal processor comprising
  a target signal estimator for providing an estimate of the target signal;
  a noise estimator for providing an estimate of the noise;
  a gain estimator for providing respective gain values in dependence of said target signal estimate and said noise estimate, wherein said gain estimator comprises a neural network comprising at least one layer defined as a gated recurrent unit, the gated recurrent unit comprising memory in the form of a hidden state vector h, wherein the weights of the neural network have been trained with a plurality of training signals, and wherein the outputs of the neural network comprise real or complex valued gains, or separate real valued gains and real valued phases;
wherein the signal processor is configured—at a given time instance t—to calculate changes $\Delta x(i,t)=x(i,t)-\hat{x}(i,t-1)$, and $\Delta h(j,t-1)=h(j,t-1)-\hat{h}(j,t-2)$ to an input vector x(t) and to the hidden state vector h(t−1), respectively, from one time instance, t−1, to the next, t, and where $\hat{x}(i,t-1)$ and $\hat{h}(j,t-2)$ are estimated values of x(i,t−1) and h(j,t−2), respectively, where indices i, j refers to the $i^{th}$ input neuron and the $j^{th}$ neuron of the hidden state, respectively, where $1 \le i \le N_{ch,x}$ and $1 \le j \le N_{ch,oh}$, wherein $N_{ch,x}$ and $N_{ch,oh}$ is the number of processing channels of the input vector x and the hidden state vector h, respectively, and
wherein the signal processor is further configured to provide that a number of updated channels among said $N_{ch,x}$ and said $N_{ch,oh}$ processing channels of the modified gated recurrent unit for said input vector x(t) and said hidden state vector h(t−1), respectively, at said given time instance t is limited to a number of peak values $N_{p,x}$ and $N_{p,oh}$, respectively, where $N_{p,x}$ is smaller than $N_{ch,x}$, and $N_{p,oh}$ is smaller than $N_{ch,oh}$.

2. A hearing device according to claim 1 wherein the signal processor is configured to determine said estimated values of the input vector and the hidden state vector as $$\hat{x}(i, t) = \begin{cases} x(i, t), & \text{if } |x(i, t) - \hat{x}(i, t-1)| \text{ is among} \\ & \text{the } N_p \text{ largest values across } i \\ \hat{x}(i, t-1) & \text{otherwise} \end{cases}$$

$$\hat{h}(j, t-1) = \begin{cases} h(j, t-1), & \text{if } |h(j, t-1) - \hat{h}(j, t-2)| \text{ is among} \\ & \text{the } N_p \text{ largest values across } j \\ \hat{h}(j, t-2) & \text{otherwise} \end{cases}$$

where indices i, j refers to the $i^{th}$ input neuron and the $j^{th}$ neuron of the hidden state, respectively, where $1 \le i \le N_{ch}$ and $1 \le j \le N_{ch}$.

3. A hearing device according to claim 2 wherein the signal processor is configured to determine said changes to values of the input vector and the hidden state vector as $$\Delta x(i, t) = \begin{cases} x(i, t) - \hat{x}(i, t-1), & \text{if } |x(i, t) - \hat{x}(i, t-1)| \text{ is among} \\ & \text{the } N_p \text{ largest values across } i \\ 0 & \text{otherwise} \end{cases}$$

$$\Delta h(j, t-1) = \begin{cases} h(j, t-1) - \hat{h}(j, t-2), & \text{if } |h(j, t-1) - \hat{h}(j, t-2)| \text{ is among} \\ & \text{the } N_p \text{ largest values across } j \\ 0 & \text{otherwise} \end{cases}$$

4. A hearing device according to claim 1 wherein the input unit comprises a multitude of input transducers and a beamformer filter, wherein the beamformer filter is configured to provide said at least one electric input signal based on signals from said multitude of input transducers.

5. A hearing device according to claim 1 comprising a voice activity detector configured to estimate whether or not, or with what probability, an input signal comprises a voice signal at a given point in time, and to provide a voice activity control signal indicative thereof.

6. A hearing device according to claim 1 comprising an output unit configured to provide output stimuli to the user in dependence of said at least one electric input signal.

7. A hearing device according to claim 1 wherein the signal processor is configured to apply the gain values G(k,t) provided by the SNR-to-gain converter to the at least one electric input signal, or to a signal derived therefrom.

8. A hearing device according to claim 1 wherein the signal processor is configured to discard processing of a channel among said $N_p$ channels at a given time instant t in case its absolute value $|x(t)-\hat{x}(t-1)|$ or $|h(t-1)-\hat{h}(t-2)|$ is smaller than a threshold value $\Theta_p$.

9. A hearing device according to claim 1 wherein the number of peak values $N_{p,x}$ and $N_{p,oh}$, respectively, is adaptively determined in dependence of the at least one electric input signal.

10. A hearing device according to claim 1 wherein parameters of the neural network have been trained with a plurality of training signals.

11. A hearing device according to claim 1 being constituted by or comprising an air-conduction type hearing aid, a bone-conduction type hearing aid, a cochlear implant type hearing aid, or a combination thereof.

12. A hearing device according to claim 1 being constituted by or comprising a headset an earphone.

13. A hearing device according to claim 1 comprising a hardware block specifically adapted to process elements of the gated recurrent unit as vectorized operations.

14. A hearing device according to claim 1 wherein the input vector of the neural network is based on or comprises said estimate of the target signal and said estimate of the noise, or a signal or signals originating therefrom.

15. A hearing device according to claim 14 wherein the lector of the neural network comprises a gain of a noise reduction algorithm.

16. A hearing device according to claim 1 wherein the number of input nodes may in the range from 16 to 500, and wherein the number of output nodes is in the range from 1 to 150.

17. A hearing device according to claim 1 wherein the number of hidden layers in the neural network is in the range from two to ten.

18. A hearing device according to claim 1 wherein the number of layers implemented as a modified gated recurrent unit in the range from one to three.

19. A method of operating a hearing device, the method comprising
providing at least one electric input signal in a time-frequency representation k, t, where k and t are frequency and time indices, respectively, and k represents a frequency channel, k=1, ..., K, the at least one electric input signal being representative of sound and comprising target signal components and noise components; and providing an estimate of the target signal;

providing an estimate of the noise;

providing respective gain values in dependence of said target signal estimate and said noise estimate, wherein said gain estimator comprises a neural network, wherein the weights of the neural network have been trained with a plurality of training signals, and wherein the outputs of the neural network comprise real or complex valued gains, or separate real valued gains and real valued phases;

providing that the neural network comprises at least one layer defined as a gated recurrent unit, the gated recurrent unit comprising memory in the form of a hidden state vector h, and wherein an output vector o(t) is provided by said gated recurrent unit in dependence of an input vector x(t) and said hidden state vector h(t−1), wherein said output o(t) at a given time step t is stored as said hidden state h(t) and used in the calculation of the output vector o(t+1) in the next time step t+1, and wherein the method further comprises determining changes $\Delta x(i,t)=x(i,t)-\hat{x}(i,t-1)$, and $\Delta h(j,t-1)=h(j,t-1)-\hat{h}(j,t-2)$ to the input vector x(t) and to the hidden state vector h(t−1), respectively, front one time instance, t−1, to the next, t, and where $\hat{x}(i,t-1)$ and $\hat{h}(j,t-2)$ are estimated values of x(i,t−1) and h(j,t−2), respectively, where indices i, j refers to the $i^{th}$ input neuron and the $j^{th}$ neuron of the hidden state, respectively, where $1 \le i \le N_{ch,x}$ and $1 \le j \le N_{ch,oh}$, wherein $N_{ch,x}$ and $N_{ch,oh}$ is the number of processing channels of the input vector x and the hidden state vector h, respectively, and wherein the signal processor is further configured to provide that the number of updated channels among said $N_{ch,x}$ and said $N_{ch,oh}$, processing channels of the modified gated recurrent unit for said input vector x(t) and said hidden state vector h(t−1), respectively, at said given time instance t is limited to a number of peak values $N_{p,x}$, and $N_{p,oh}$, respectively, where $N_{p,x}$ is smaller than $N_{ch,x}$ and $N_{p,oh}$, is smaller than $N_{ch,oh}$.

20. A method of operating an audio processing device comprising at least an input unit and a signal processor for processing outputs of the input unit and for providing a processed output, the signal processor comprising a neural network comprising at least one layer implemented as a modified gated recurrent unit (modified GRU) comprising memory in the form of a hidden state vector (h(t−1)), the method comprising providing by the input unit at least one electric input signal in a time-frequency representation k, t, where k and t are frequency and time indices, respectively, and k represents a frequency channel, k=1, ..., K, the at least one electric input signal being representative of sound or image data; and providing an input vector x(t) to the at least one layer implemented as a gated recurrent unit (GRU) based on or comprising said at least one electric input signal, or a signal originating therefrom;

calculating by the signal processor—at a given time instance t—changes $\Delta x(i,t)=x(i,t)-\hat{x}(i,t-1)$, and $\Delta h(j,t-1)=h(j,t-1)-\hat{h}(j,t-2)$ to the input vector x(t) and to the hidden state vector h(t−1), respectively, from one time instance, t−1, to the next, t, and where $\hat{x}(i,t-1)$ and $\hat{h}(j,t-2)$ are estimated values of x(i,t−1) and h(j,t−2), respectively, where indices i, j refers to the $i^{th}$ input neuron and the $j^{th}$ neuron of the hidden state, respectively, where $1 \le i \le N_{ch,x}$ and $1 \le j \le N_{ch,oh}$, wherein $N_{ch,x}$ and $N_{ch,oh}$ is the number of processing channels of the input vector x and the hidden state vector h, respectively; and providing by the signal processor that the number of updated channels among said $N_{ch,x}$ and said $N_{ch,oh}$ processing channels of the modified gated recurrent unit for said input vector x(t) and said hidden state vector h(t−1), respectively, at said given time instance t is limited to a number of peak values $N_{p,x}$, and $N_{p,oh}$, respectively, where $N_{p,x}$ is smaller than and $N_{ch,x}$, and $N_{p,oh}$, is smaller than $N_{ch,oh}$;

calculating by the signal processor—at a given time instance—an output vector o(t) from the at least one layer implemented as a gated recurrent unit (GRU) in dependence of said input vector x(t) and said hidden state vector k(t−1), and wherein the output o(t) at a given time step t is stored as the hidden state h(t) and used in the calculation of the output vector o(t+1) in the next time step t+1;

wherein the processed output is determined by the signal processor in dependence of said output vector o(t) or a signal originating therefrom; and wherein the processed output is used for controlling processing in the audio processing device and/or transmitted by the audio processing device to another device.

* * * * *